(12) United States Patent
Sameda et al.

(10) Patent No.: US 7,970,557 B2
(45) Date of Patent: Jun. 28, 2011

(54) GAS APPLIANCE JUDGMENT APPARATUS AND METHOD

(75) Inventors: Yoshito Sameda, Yokohama (JP); Kenji Nakano, Kodaira (JP); Yukio Takanohashi, Hachioji (JP); Hiroto Uyama, Tokyo (JP); Masaaki Ishino, Tokyo (JP)

(73) Assignee: Toshiba Toko Meter Systems Co., Ltd., Tokyo (JP)

( * ) Notice: Subject to any disclaimer, the term of this patent is extended or adjusted under 35 U.S.C. 154(b) by 422 days.

(21) Appl. No.: 12/169,287

(22) Filed: Jul. 8, 2008

(65) Prior Publication Data

US 2009/0018782 A1 Jan. 15, 2009

(30) Foreign Application Priority Data

Jul. 9, 2007 (JP) ................................ 2007-180068

(51) Int. Cl.
*G01F 1/00* (2006.01)

(52) U.S. Cl. ........................................................ 702/45

(58) Field of Classification Search .................... 702/45; 73/290 B, 40.5 R, 592; 137/487; 72/45; 431/328; 417/312
See application file for complete search history.

(56) References Cited

U.S. PATENT DOCUMENTS

| | | | | |
|---|---|---|---|---|
| 4,144,743 A * | 3/1979 | Covington et al. | ........ | 73/40.5 R |
| 5,369,598 A | 11/1994 | Horiike et al. | | |
| 6,460,565 B1 * | 10/2002 | Titus | .............................. | 137/487 |
| 2006/0174707 A1 * | 8/2006 | Zhang | .............................. | 73/592 |
| 2009/0013765 A1 * | 1/2009 | Nakano et al. | ............. | 73/40.5 R |

FOREIGN PATENT DOCUMENTS

| | | |
|---|---|---|
| JP | 7-174594 | 7/1995 |
| JP | 2003-149019 | 5/2003 |
| JP | 2003-149027 | 5/2003 |
| JP | 2003-149075 | 5/2003 |
| JP | 2005-331373 | 12/2005 |
| KR | 1995-12817 | 10/1995 |

\* cited by examiner

*Primary Examiner* — Drew A Dunn
*Assistant Examiner* — Xiuquin Sun
(74) *Attorney, Agent, or Firm* — Oblon, Spivak, McClelland, Maier & Neustadt, L.L.P.

(57) ABSTRACT

A gas appliance judgment apparatus and method by which a type of gas appliance in use and the existence of a gas leak can be identified. In operation, noise is removed from measured instantaneous flow volume, whereupon the "length", "initial flow volume" and "sequence of transited regions" of the variable portion of the flow volume and the "length", "average value" and "gradient" of the flat portion of the flow volume are extracted. A rule having characteristics data which matches the characteristics of the variable portion and the flat portion of the flow volume is then searched, and points are added respectively for the type of gas appliance and for the existence of a gas leak. When the added points are not less than a previously established threshold value, then the type of gas appliance in use is determined, and appliance type information is output as a judgment result.

13 Claims, 13 Drawing Sheets

FIG. 7

FLOW VOLUME DIVISION TABLE

| DIVISION NO. | FLOW VOLUME L/h |
|---|---|
| 50 | ~ 10 |
| 51 | 10 ~ 20 |
| 52 | 20 ~ 30 |
| 53 | 30 ~ 40 |
| 54 | 40 ~ 50 |
| 55 | 50 ~ 60 |
| ... | ... |

FIG. 8

(A) RULE OF VARIABLE PORTION

| RULE NO. | APPLIANCE NO. | POINTS OF COMPLETE MATCHING | ... | POINTS OF PARTIAL MATCHING | LENGTH DIVISION | INITIAL FLOW VOLUME DIVISION | TRANSITED REGION 1 | TRANSITED REGION 2 | ... |
|---|---|---|---|---|---|---|---|---|---|
| 1 | 3 | 90 | 50 | 30 | 5 | 0 | 151 | 152 | 53 |
| 2 | 3 | 90 | 50 | 30 | 7 | 400 | 151 | 152 | 60 |
| 3 | ... | ... | ... | ... | ... | ... | ... | ... | ... |

(B) RULE OF FLAT PORTION

| RULE NO. | APPLIANCE NO. | POINTS OF COMPLETE MATCHING | ... | POINTS OF PARTIAL MATCHING | LENGTH DIVISION | GRADIENT DIVISION | AVERAGE VALUE DIVISION |
|---|---|---|---|---|---|---|---|
| 31 | 3 | 90 | 50 | 30 | 40 | 151 | 51 |
| 32 | 3 | 90 | 50 | 30 | 41 | 151 | 55 |
| 33 | ... | ... | ... | ... | ... | ... | ... |

FIG. 9

| | CUMULATIVE POINTS |
|---|---|
| APPLIANCE 1 | 10 |
| APPLIANCE 2 | 80 |
| APPLIANCE 3 | 55 |
| APPLIANCE 4 | 90 |
| ... | ... |

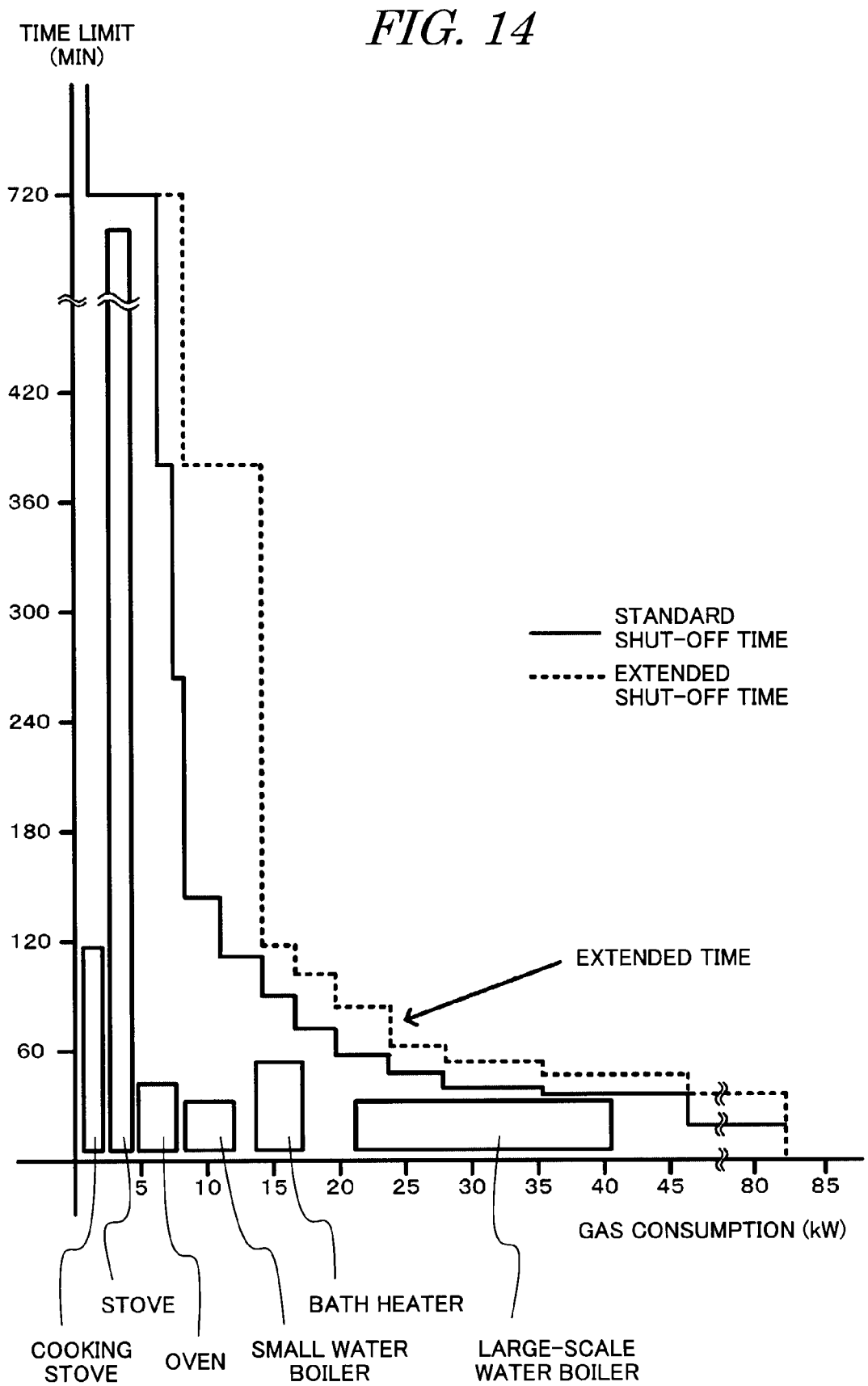

GAS APPLIANCE JUDGMENT APPARATUS AND METHOD

BACKGROUND OF THE INVENTION

1. Field of the Invention

The present invention relates to a gas appliance judgment apparatus and judgment method used in a gas meter or the like which is disposed in a gas supply line to a domestic dwelling and has a gas flow meter, and more particularly it relates to technology which enables the provision of higher advanced safety functions and services which are appropriate to gas appliances by identifying the type of gas appliance in use and identifying the presence or absence of a gas leak.

2. Description of the Related Art

A gas meter incorporating a gas flow meter is installed at the inlet port of the gas supply line to a domestic dwelling. The gas meter measures the gas flow volume passing through the gas supply line, and the measured gas flow volume is used to calculate a periodic gas billing amount. In addition to basic functions, such as measuring the gas flow volume, the gas meter also has a safety function for shutting off the gas supply when an abnormal state occurs. This safety function is a function which shuts off the gas by means of a shut-off valve provided in the gas flow path of the gas meter, in response to the detection of an abnormal usage state, for instance, if an earthquake is detected, if there is a gas leak or if the appliance is left without turned off, and the like.

FIG. 14 is a diagram showing the safe continuous use time settings employed in a shut-off function in the event that the safe continuous use time has been exceeded, which is one of the safety functions described above. This function is a function whereby, in cases where the occurrence of a gas flow has been detected and the gas flow is used continuously thereafter, then if the continuous use time has become excessively long, it is considered that an abnormal usage state of some kind, such as a gas leak, has occurred, and hence the gas is shut off.

As shown in FIG. 14, a large-scale water boiler which uses a large gas flow volume is only used continuously for approximately 30 minutes, whereas a stove which uses a small gas flow volume may be used continuously for a long period of time, and therefore based on this premise, the safe continuous use time is set to a short time when the gas flow volume is large and the safe continuous use time is set to a long time when the gas flow volume is small.

The gas meter judges that a gas appliance of some kind has started to be used, when a gas flow volume has occurred and or when the gas flow volume has changed into an increase, and based on this judgement, measures the time during which this flow rate continues. If this flow volume continues for a time exceeding the safe continuous use time shown in FIG. 14, then the gas meter shuts off the gas for safety reasons. Consequently, rather than identifying the gas appliance in use, a shut-off due to over-run of the safe continuous use time is implemented, on the basis of the used gas flow volume.

However, as shown in FIG. 14, in the small gas flow range, there are gas appliances of a plurality of types which have significantly different use times, such as stoves which are used for a relatively long period of time, and cooking stoves or small water boilers which are only used for a relatively short period of time, or the like. In the case of a conventional gas meter, it is not possible to identify the type of gas appliance in use, and therefore the safe continuous use time for this flow volume range is set to a relatively long time to match the stove which is used for a long period of time. The safe continuous use time which is set to a long time in this way is excessively long for a cooking stove or small water boiler which are situated in the same flow volume range, and therefore it does not necessarily represent the optimal safe continuous use time. In other words, this method does not identify the type of gas appliance in use and therefore it has difficulty in providing a safety function which is suited to the type of gas appliance.

From the viewpoint of overcoming the problems described above, proposals relating to gas appliance judgment apparatuses have been made in the prior art, as described in Japanese Patent Application Publication No. 2003-149019, Japanese Patent Application Publication No. 2003-149027 and Japanese Patent Application Publication No. 2003-149075, for example. In these prior art technologies, in order to identify the type of gas appliance in use from the change in the gas flow volume when the gas appliance is used, the type of gas appliance is identified by a method of the following kind, based on the concept of a partial flow volume pattern in which a complex sequence of changes in the gas flow volume is divided into respective combustion control steps.

In other words, firstly, partial flow volume patterns are classified according to control steps for a plurality of types of gas appliances which may be used, and these patterns are recorded in a flow volume pattern table. Furthermore, the combination of partial flow volume patterns corresponding to a plurality of different gas appliances is recorded in an appliance table. A partial flow volume pattern which matches a gas flow volume pattern determined by the gas flow meter is extracted from the flow volume pattern table, and furthermore, a gas appliance which matches the extracted combination of partial flow volume patterns is extracted from the appliance table.

In this prior art technology, the complex sequence of gas flow volume patterns which accompany the combustion control of a gas appliance are simplified into partial flow volume patterns which are split into respective control steps, and therefore matching with the determined gas flow volume pattern can be carried out readily and the type of gas appliance can be identified.

In particular, the inventions described in Japanese Patent Application Publication No. 2003-149019, Japanese Patent Application Publication No. 2003-149027 and Japanese Patent Application Publication No. 2003-149075 identify a gas appliance on the basis of at least three flow volume patterns occurring at respective combustion control steps: "ignition", "initial transient period after ignition" and "stable period after stabilization of flow volume". Furthermore, in addition to these flow volume patterns, the flow volume range is monitored in each control step, and the appliance is also identified by considering whether or not the flow volume of the determined gas flow volume pattern corresponds to the flow volume range recorded previously in the appliance table.

Although it is true that the prior art technology described in Japanese Patent Application Publication No. 2003-149019, Japanese Patent Application Publication No. 2003-149027 and Japanese Patent Application Publication No. 2003-149075 detailed above is suitable for identifying certain types of appliances which have flow volume patterns having clearly defined characteristics, since the gas appliance is always identified only on the basis of a partial flow volume pattern (or the partial flow volume pattern and the flow volume range), then this cannot be regarded as suitable judgment technology for circumstances where a large variety of gas appliances are used, as is current custom.

In particular, in the case of appliances which produce large variations in the flow volume, such as a cooking stove, a water boiler, or a bath heater, which have conventionally been used widely in normal homes, it has been possible to identify the appliance simply by monitoring the flow volume pattern and range, but in the case of appliances which show little variation in the flow volume over a long period of time, such as floor heaters where are used in most recent dwellings, it has been difficult to identify the appliance and to determine leaking simply by monitoring the flow volume.

Furthermore, there is a great difference in the flow volume pattern during use, between an appliance which does not have a governor (pressure regulator) for automatically regulating the flow volume and pressure and which is simply controlled by manual adjustment, such as a cooking stove, and an appliance which is fitted with a governor, such as a fan heater. Therefore, it has been difficult to identify the appliance simply by monitoring the range and variation of the flow volume. In the prior art, methods have also been proposed for identifying whether an appliance is fitted with a governor, is not fitted with a governor, or whether there is a gas leak, by comparison with flow volume change patterns in the event of a pressure drop, and flow volume values which have been measured in the past (for example, see Japanese Patent Application Publication No. 2005-331373), but when using a method of this kind, if there is a gas leak, or if a gas appliance not fitted with a governor is used continuously, the range and pattern of the flow volume will continue in an unchanging state in both cases, and therefore it is difficult to distinguish between these cases.

SUMMARY OF THE INVENTION

The present invention was devised in order to resolve the problems of the prior art described above, a first object thereof being to provide a gas appliance judgment apparatus and method whereby the type of gas appliance in use can be identified and a gas leak can be detected, efficiently and accurately, as well as being able to distinguish efficiently and accurately between the occurrence of a gas leak and the continuous use of a gas appliance which is not fitted with a governor.

It is a second object of the present invention to provide a gas appliance judgment apparatus and method whereby the presence or absence of a governor in use can be judged efficiently and accurately, as well as being able to distinguish between the occurrence of a gas leak and the continuous use of a gas appliance which is not fitted with a governor.

In order to achieve the first object described above, a gas appliance judgment apparatus in accordance with the present invention, in a first aspect, comprises: a flow volume measurement means for measuring the instantaneous flow volume of gas flowing inside a gas flow channel; a noise removal means for removing noise from the instantaneous flow volume data which has been measured by the flow volume measurement means; an object extraction means for extracting data of a variable portion and a flat portion of the flow volume, from the instantaneous flow volume data from which the noise has been removed by the noise removal means; a characteristics extraction means for extracting, as the characteristics of the gas flow, characteristics of the data of the variable portion and the flat portion of the flow volume which has been extracted by the object extraction means; a rule storage means for storing respective rules which include characteristic data of the variable portion and the flat portion of the flow volume, for respective types of gas appliance or for a gas leak; and an appliance judgment means for determining the type of gas appliance in use or the presence or absence of a gas leak and outputs a judgment result, by comparing the characteristics data included in the rules stored in the rule storage means with the characteristics of the gas flow which has been extracted by the characteristics extraction means; wherein the characteristics extraction means is composed so as to extract characteristics including a combination of an instantaneous flow volume and the time differential value of the instantaneous flow volume as the characteristics of the variable portion of the flow volume.

In order to achieve the second object described above, a gas appliance judgment apparatus in accordance with the present invention, in a second aspect, comprises: a flow volume measurement means and pressure measurement means for measuring the instantaneous flow volume and the pressure of gas flowing inside a gas flow channel; a noise removal means for removing noise from the instantaneous flow volume data and pressure data which has been measured by the flow volume measurement means and the pressure measurement means; an object extraction means for respectively extracting data of a prescribed time period at respective sampling timings, from the instantaneous flow volume data and pressure data from which noise has been removed by the noise removal means; a characteristics extraction means for extracting, as the characteristics of the data of the prescribed time period which has been extracted by the object extraction means, characteristics including the dispersion in the ratio between the flow volume and the square root of the pressure or the ratio between the flow volume and the pressure; and a governor presence judgment means for judging the presence or absence of a governor in use and outputs a judgment result on the basis of the characteristics of the data of the prescribed time period which has been extracted by the characteristics extraction means.

Furthermore, gas appliance judgment methods in accordance with the present invention, respectively state the functions of the gas appliance judgment apparatuses of the present invention described above, in terms of a method.

According to the gas appliance judgment apparatus and method in the first aspect described above, the type of gas appliance and the occurrence of a gas leak is judged on the basis of a combination of the instantaneous flow volume of the gas and the time differential value of the instantaneous flow volume, and therefore such judgment is possible even in the case of appliances which cannot be judged simply on the basis of the flow volume pattern and range. Consequently, problems where a gas leak is judged unduly due to the inability to identify the gas appliance are avoided, and safety is improved.

In particular, by using the time differential value of the instantaneous flow volume in order to identify the appliance, it becomes possible to simplify the pattern for comparison, with respect to a case where the appliance is identified simply by matching flow volume patterns, and hence various techniques for extracting the characteristics can be applied freely. As a result, it is possible to judge an appliance efficiently and accurately, simply by extracting the characteristics including the combination of the instantaneous flow volume and the time differential value of the instantaneous flow volume, and comparing with a simple comparison pattern. Furthermore, it is also possible to determine the start-up time and the end time of the gas appliance from the combination of the instantaneous flow volume and the time differential value of the instantaneous flow volume, and therefore it is possible to distinguish efficiently and accurately between the occurrence of a gas leak and the continuous use of a gas appliance which is not fitted with a governor.

Consequently, according to the gas appliance judgment apparatus and method in the first aspect, it is possible to provide a gas appliance judgment apparatus and method whereby the type of gas appliance in use can be identified and a gas leak can be detected, efficiently and accurately, as well as being able to distinguish efficiently and accurately between the occurrence of a gas leak and the continuous use of a gas appliance which is not fitted with a governor.

Furthermore, as a technique for extracting the characteristics relating to the instantaneous flow volume and the time differential value of the instantaneous flow volume, it is possible to use a technique based on division into regions, such as (1) or (2) below, for example.

(1) The characteristics are extracted by representing the measured instantaneous flow volume and the time differential value of the instantaneous flow volume on a two-dimensional graph, and dividing same into regions.

(2) The characteristics are extracted by representing the measured instantaneous flow volume and the time differential value of the instantaneous flow volume on a two-dimensional graph, dividing same into regions, and then determining the transitions of the instantaneous flow volume and the time differential value of the instantaneous flow volume which move in a time sequence within these divided regions.

According to the gas appliance judgment apparatus in the first aspect, by employing a technique based on division into regions in this way, it is possible to achieve efficient and accurate judgment of a gas appliance, simply by performing a straightforward compare/search and calculation operation in order to check whether or not the same regions are included as in a comparison pattern, in contrast to a technique which carries out pattern matching by converting the actual flow volume pattern itself into a graph.

According to the gas appliance judgment apparatus and method in the second aspect described above, by using the ratio between the flow volume and the square root of the pressure, or a substitute value, in order to judge the presence or absence of a governor, it is possible to ascertain the state of the amount of opening of the gas spray nozzle of the gas appliance. In other words, if the ratio of the flow volume to the square root of the pressure is determined, then this value corresponds to the amount of opening of the gas spray nozzle section of the gas appliance, and therefore it is possible to judge that a governor is present in cases where the amount of opening of the gas spray nozzle is altered in response to pressure variations in such a manner that the flow volume remains constant, and to judge that a governor is absent in cases where the amount of opening of the gas spray nozzle is uniform and the flow volume changes.

If no governor is present, then this means that the gas appliance is one which is not fitted with a governor, such as a cooking stove, or that there is a gas leak, and if a governor is present, then this means that the gas appliance is one which is fitted with a governor, such as a fan heater. Therefore it is possible to distinguish accurately between a gas leak or a cooking stove which require the gas supply to be shut off especially by a safety function, and an appliance such as a fan heater in which it is necessary to prevent unwanted shut-off. As a result of this, it is possible to prevent mistaken shut-off during prolonged use of a gas appliance which is fitted with a governor, such as a fan heater. Furthermore, since the start-up time and the end time of a gas appliance can be judged from the ratio between the flow volume and the square root of the pressure, or a substitute value, then it is possible to distinguish efficiently and accurately between the occurrence of a gas leak and the continuous use of a gas appliance which is not fitted with a governor.

If the change in the gas pressure is relatively small, then it is possible to judge the presence or absence of a governor, with a small margin of error in calculation, by using the pressure value itself as a substitute value for the square root of the pressure and by simply finding the ratio between the flow volume and the pressure. If the presence of a governor is judged by finding the ratio between the flow volume and the pressure in this way, then the calculational load can be reduced in comparison with a case where the ratio between the flow volume and the square root of the pressure is found, and therefore efficiency can be improved. On the other hand, if there is a relatively large variation in the gas pressure, then better accuracy is achieved if the ratio between the flow volume and the square root of the pressure is found.

Consequently, according to the gas appliance judgment apparatus and method in the second aspect, it is possible to provide a gas appliance judgment apparatus and method whereby the presence or absence of a governor in use can be judged efficiently and accurately, as well as being able to distinguish efficiently and accurately between the occurrence of a gas leak and the continued use of a gas appliance which is not fitted with a governor.

BRIEF DESCRIPTION OF THE DRAWINGS

FIG. 7 is a diagram showing one example of a division table used in the gas flow characteristics extraction processing according to the first embodiment;

FIG. 8 is a diagram showing one example of rules for the variable portion and flat portion of the flow volume which are used in the rule match search and point addition processing according to the first embodiment;

FIG. 9 is a diagram showing one example of the result of a cumulative point score from the rule match search and point addition processing according to the first embodiment;

FIG. 14 is a diagram showing limit time settings used in the judgment of over-run of the safe continuous use time.

DESCRIPTION OF THE PREFERRED EMBODIMENTS

Figure 1:
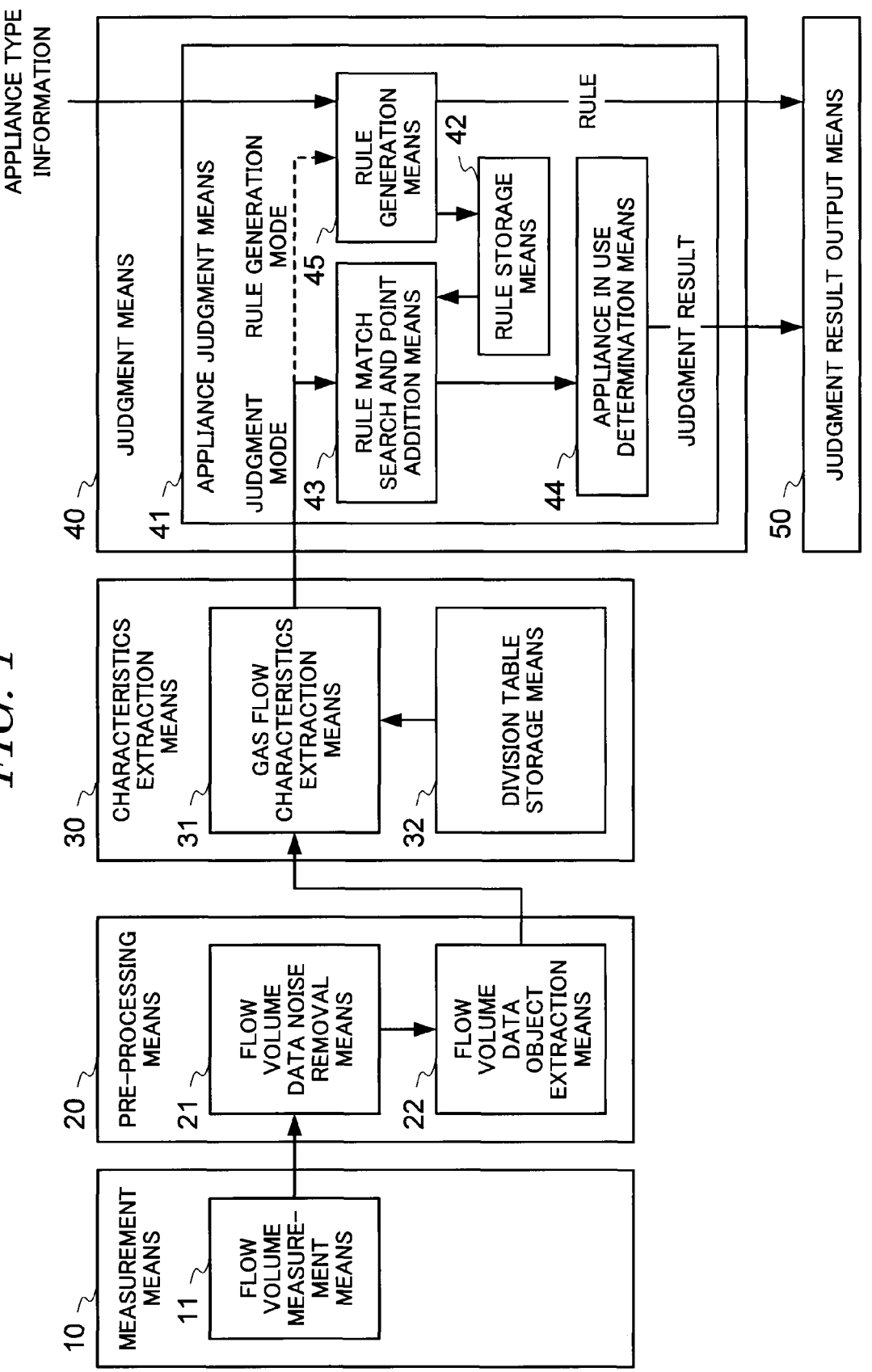
FIG. 1 is a functional block diagram showing the composition of a gas appliance judgment apparatus according to a first embodiment to which the present invention is applied.

Below, a plurality of embodiments in which the present invention is applied will be described in concrete terms by referring to the drawings.

First Embodiment

Composition

FIG. 1 is a functional block diagram showing the composition of a gas appliance judgment apparatus according to a first embodiment to which the present invention has been applied. As shown in FIG. 1, the gas appliance judgment apparatus according to the present embodiment is composed of a measurement means 10, a pre-processing means 20, a characteristics extraction means 30, a judgment means 40, and a judgment result output means 50. The details of the means 10 to 50 are as follows.

The measurement means 10 has a flow volume measurement means 11 for measuring the instantaneous flow volume q[t] of the gas flowing inside a gas supply flow channel (gas pipe). It is possible to use various types of measurement means for the flow volume measurement means 11, but in the present embodiment, it is supposed that an ultrasonic flow volume meter is used.

For example, this ultrasonic flow volume meter has a gas inflow port, a gas flow channel, a gas outflow port, a shut-off valve, a display unit and a control unit. Ultrasonic vibrating elements are provided inside the gas flow channel, respectively in the upstream portion and the downstream portion of the gas flow channel. An ultrasonic wave is transmitted and received repeatedly, in the forward direction and reverse direction of the flow respectively, between the ultrasonic vibrating element in the upstream portion and the ultrasonic vibrating element in the downstream portion, and the integral propagation time of the ultrasonic wave in either direction is determined. The instantaneous flow volume is calculated on the basis of the difference in propagation time thus obtained.

The pre-processing means 20 has a flow volume data noise removal means 21 for removing noise from the instantaneous flow volume data measured by the flow volume measurement means 11, and a flow volume data object extraction means 22 for extracting data on the variable portion of the flow volume and the flat portion of the flow volume, from the instantaneous flow volume data from which the noise has been removed.

The characteristics extraction means 30 has a gas flow characteristics extraction means 31 for extracting, as the characteristics of the gas flow, the characteristics of the data on the variable portion and the flat portion of the flow volume extracted by the flow volume data object extraction means 22, and a division table storage means 32 for previously storing a division table in which division numbers are associated with divisions obtained by dividing a range of assumed index values showing the respective characteristic items into a plurality of divisions.

The gas flow characteristics extraction means 31 extracts the "length", "initial flow volume" and "sequence of transited regions" of the variable portion of the flow volume, from the data extracted by the flow volume data object extraction means 22, and extracts the "length", "average value" and "gradient" of the flat portion of the flow volume, and converts the values of these respective characteristics, apart from the "sequence of transited regions", into division numbers of a division table which is stored in the division table storage means 32.

The "sequence of transited regions" will be described briefly here. In the present embodiment, the instantaneous flow volume and the instantaneous flow volume time differential value are arranged into a two-dimensional graph and are divided into respective regions by the gas flow characteristics extraction means 31, in such a manner that the instantaneous flow volume and the instantaneous flow volume time differential value shift within the divided regions in accordance with a time series. In this case, the "sequence of transited regions" means the sequence of the regions between which the instantaneous flow volume and the time differential value of the instantaneous flow volume shift.

The judgment means 40 has an appliance judgment means 41 for judging the type of gas appliance in use or the presence or absence of a gas leak.

The appliance judgment means 41 is composed of a rule storage means 42, a rule match search and point addition means 43, an appliance in use determination means 44, and a rule generation means 45.

The rule storage means 42 previously stores, respectively for each type of gas appliance and for a gas leak, rules which associate information about the appliance number or appliance name, etc., which indicates the type of gas appliance, with corresponding characteristics data relating to the variable portion and the flat portion of the flow volume.

The rule match search and point addition means 43 searches the rules stored in the rule storage means 42 to find a rule having characteristics data which matches the characteristics of the variable portion and the flat portion of the flow volume extracted by the gas flow characteristics extraction means 31, and points indicating the probability of the type of gas appliance, or the existence of a gas leak, indicated by that rule are added respectively for the type of gas appliance and for the existence of a gas leak. In adding the points in this way, the rule match search and point addition means 43 adds different points between when the rule is matched completely and when the rule is matched partially.

When the points added by the rule match search and point addition means 43 respectively in respect of the gas appliance type or the occurrence of a gas leak are not less than a previously established threshold value, then the appliance in use determination means 44 determines that a gas appliance of that type is in use, and outputs, as a judgment result, appliance type information such as the appliance number or appliance name indicating that gas appliance type. Furthermore, if the points added up in respect of a gas leak are not less than a threshold value, then the appliance in use determination means 44 determines that there is a gas leak and outputs, as a judgement result, gas leak warning information, such as a message which indicates a gas leak.

The rule generation means 45 generates a new rule which includes the characteristics data of the variable portion and the flat portion of the flow volume relating to each gas appliance type or a gas leak, on the basis of the characteristics of the gas flow extracted by the gas flow characteristics extraction means 31 and separately acquired information relating to the gas appliance type or the presence or absence of a gas leak. The rule generation means 45 stores this new rule in the rule storage means 42.

Of the respective means described above which constitute the gas appliance judgment apparatus according to the present embodiment, the pre-processing means 20, the characteristics extraction means 30 and the judgment means 40 can generally be achieved by a combination of electronic circuits or computers of various types, and programs specified in order to achieve the functions of these means. Furthermore, the division table storage means 32 of the characteristics extraction means 30 and the rule storage means 42 of the appliance judgment means 41 can be realized by a memory provided generally in a computer, or a storage apparatus of various kinds.

The judgment result output means 50 is a means for outputting the judgment results obtained from the appliance in use determination means 44, in the form of an indication or report to a human operator. This judgment result output means 50 may be realized by output devices of various types, such as an LCD or other display apparatus provided in a gas meter, an externally disposed reporting apparatus, or another display device, printer, gas leak warning apparatus, or the like.

(Summary of Gas Appliance Judgment Procedure)

Figure 2:
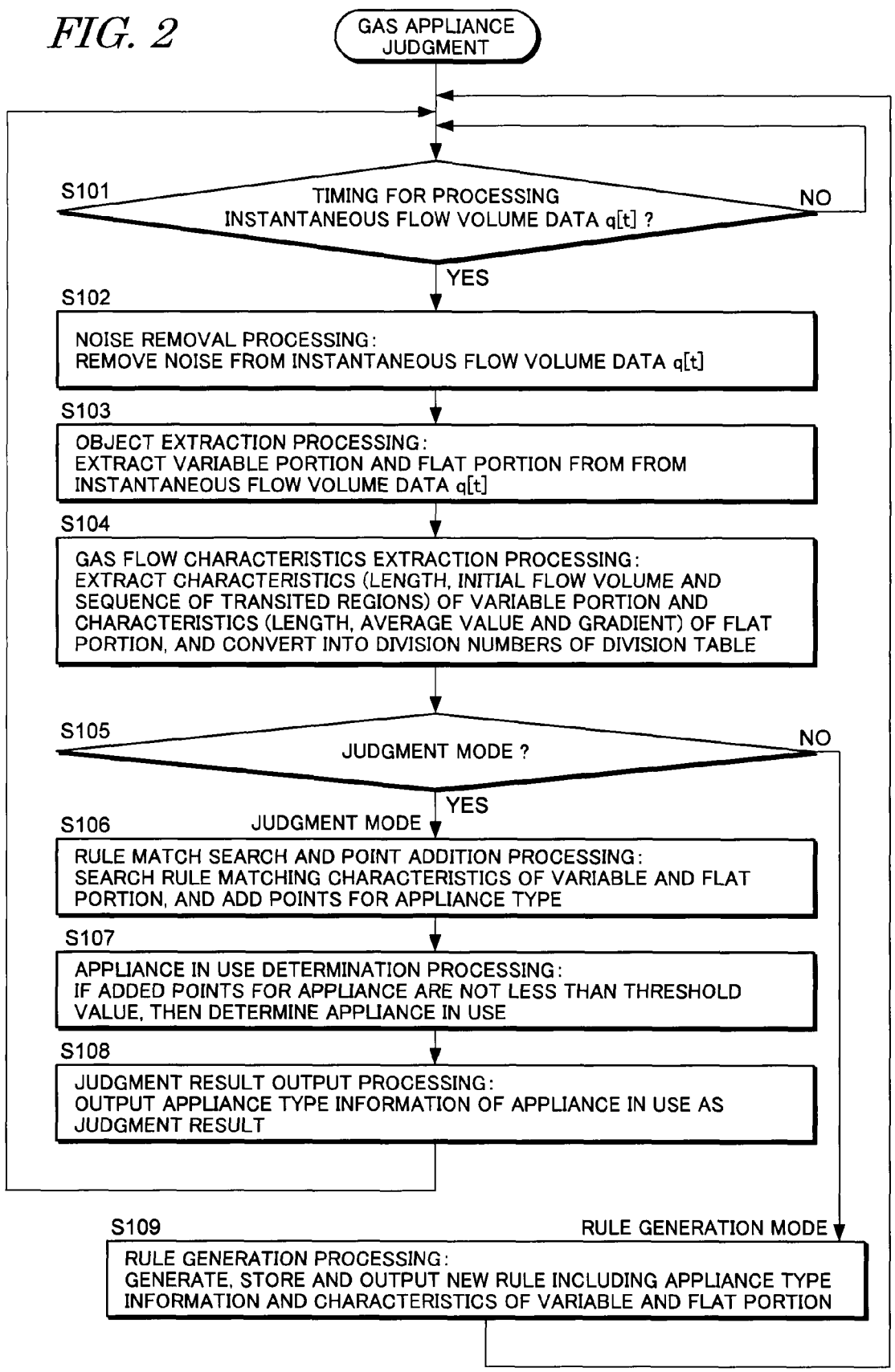
FIG. 2 is a flowchart showing one example of a gas appliance judgment procedure performed by a gas appliance judgment apparatus according to the first embodiment.

FIG. 2 is a flowchart showing one example of a gas appliance judgment procedure performed by the gas appliance judgment apparatus according to the first embodiment. In the gas appliance judgment apparatus according to the present embodiment, the flow volume measurement means 11 continuously measures the instantaneous flow volume of the gas which flows inside the gas supply flow channel (gas pipe) at a uniform sampling cycle (for example, every two seconds), and sends the measured instantaneous flow volume data q[t] to the flow volume data noise removal means 21.

The flow volume data noise removal means 21 removes the noise from the gathered instantaneous flow volume data q[t] respectively at a previously established timing for processing the instantaneous flow volume data q[t] (YES at step S101) (S102: noise removal processing). The flow volume data object extraction means 22 extracts the data of the variable portion and the flat portion of the flow volume, from the instantaneous flow volume data q[t] from which the noise has been removed (S103: object extraction processing).

The gas flow characteristics extraction means 31 extracts the "length", "initial flow volume" and "sequence of transited regions" as the characteristics of the variable portion of the flow volume, and extracts the "length", "average value" and "gradient" as the characteristics of the flat portion of the flow volume from the data of the variable portion and the flat portion of the flow volume (S104: gas flow characteristics extraction processing). In this gas flow characteristics extraction processing, the values of the respective characteristic items other than the "sequence of transited regions", in other words, the "length" and "initial flow volume" of the variable portion and the "length", "average value" and "gradient" of the flat portion, are respectively converted into division numbers of the division table which is stored in the division table storage means 32.

Furthermore, the gas appliance judgment apparatus according to the present embodiment operates in two modes, namely, a judgment mode in which the type of gas appliance or the occurrence of a gas leak is judged by means of the appliance judgment means 41, and a rule generation mode in which a new rule is generated or an existing rule is amended by the rule generation means 45. There are no particular restrictions on the technique of switching between these two modes, but a possible technique is one in which, for example, the mode is normally set to the judgment mode and is switched to the rule generation mode, if a mode switching instruction signal is issued or if information indicating an appliance type or the occurrence of a gas leak is supplied to the rule generation means 45.

In the judgment mode (YES in S105), the characteristics of the variable portion and the flat portion of the flow volume extracted by the gas flow characteristics extraction means 31 are transferred to the rule match search and point addition means 43. The rule match search and point addition means 43 searches among the rules stored in the rule storage means 42 for a rule having characteristics data which matches the transferred characteristics of the variable portion and flat portion of the flow volume, and points indicating the probability of the gas appliance type or gas leak indicated by that rule are added respectively for the gas appliance type or the gas leak (S106: rule match search and point addition processing). In this rule match search and point addition processing, different points are added, when the rule is matched completely and when the rule is matched partially.

If the points added by the rule match search and point addition means 43 for each gas appliance type are not less than a previously established threshold value, then the appliance in use determination means 44 determines that a gas appliance of that type is in use and outputs appliance type information, such as an appliance number, appliance name, or the like, which indicates the gas appliance type, as a judgment result (S107: appliance in use determination processing). In this appliance in use determination processing, if the points added in respect of a gas leak are not less than a threshold value, then it is determined that there is a gas leak, and gas leak warning information such as a message indicating a gas leak is output as a judgment result.

When a judgment result relating to the type of gas appliance or the presence or absence of a gas leak has been obtained and output by the appliance in use determination means 44 in this way, the judgment result is output by the judgment result output means 50 which is located in a subsequent stage, in the form of a screen display, or the like, whereby the judgment result can be indicated to or reported to a human operator (S108: judgement result output processing).

On the other hand, in the rule generation mode (NO at S105), the characteristics of the variable portion and the flat portion of the flow volume extracted by the gas flow characteristics extraction means 31 are transferred to the rule generation means 45. The rule generation means 45 generates a new rule including characteristics data for a variable portion and a flat portion of the flow volume, respectively for the gas appliance type or for a gas leak, on the basis of the characteristics of the variable portion and flat portion of the flow volume obtained from the gas flow characteristics extraction means 31 and separately acquired information indicating the gas appliance type or gas leak. The newly generated rule is stored in the rule storage means 42 (S109: rule generation processing).

(Details of Gas Appliance Judgment Processing)

Below, the respective processes from the noise removal processing (S102) to the judgment result output processing (S108) in the gas appliance judgment procedure shown in FIG. 2, and the rule generation processing (S109), are successively described in detail.

(Noise Removal Processing)

The technique used in the noise removal processing (S102 in FIG. 2) carried out by the flow volume data noise removal means 21 is, for example, that represented by the following conditional expression (1) or (2), where q expresses the original flow volume data and Q expresses the flow volume data after removal of noise.

$$\text{if } |q[t+1] - q[t-1]| < \text{threshold value} \quad \text{Expression (1)}$$
$$\text{then } Q[t] = (q[t+1] + q[t] + q[t-1])/3$$
$$\text{else } Q[t] = q[t]$$

Alternatively, $$\text{if } |q[t+1] - q[t-1]| < q[t] * \text{uniform ratio} \quad \text{Expression (2)}$$
$$\text{then } Q[t] = (q[t+1] + q[t] + q[t-1])/3$$
$$\text{else } Q[t] = q[t]$$

According to this technique, if the difference between a particular sampled flow volume q[t] at a particular point in time t of the instantaneous flow volume data measured by the flow volume measurement means 11, and the sampled flow volumes q[t−1] and q[t+1] before and after that particular sampled flow volume q[t] is not more than a uniform value (threshold value) or is not more than a uniform ratio of the flow volume q[t] at the particular point in time, then the average flow volume of the three points q[t−1], q[t] and q[t+1] is set as the flow volume at the particular point in time t. In the present specification, the "uniform value", "threshold value" and "uniform ratio" mean respective boundary values or reference values which are set in advance for the purpose of limiting value ranges or for comparison and judgment.

Figure 3:
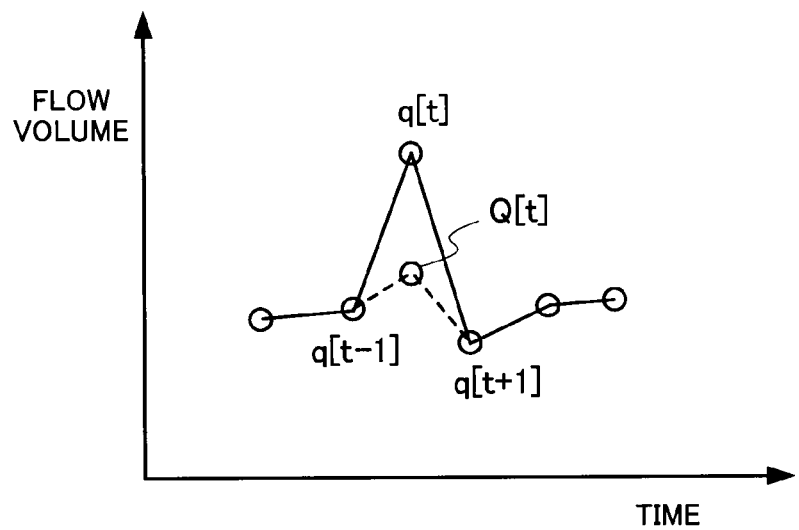
FIG. 3 is a diagram showing one example of a technique of noise removal processing according to the first embodiment.

FIG. 3 is a diagram for describing the principles of the technique according to conditional expression (1) or (2) in this way, and it shows an example of a case where the flow volume q[t] at a particular time t of the instantaneous flow volume data plotted in a time/flow volume plane, projects upwards in comparison with the flow volumes q[t−1] and q[t+1] which are situated before and after q[t]. In this diagram, FIG. 3, the original flow volume q[t] is amended to the flow volume Q[t] after noise removal as indicated by a broken line, thereby removing the noise component.

By removing the noise of the instantaneous flow volume data in this way, it is possible to process the data into data which can be readily handled in the subsequent object extraction processing and gas flow characteristics extraction processing. In particular, according to this technique, a merit is obtained in that the accuracy of noise removal from the instantaneous flow volume data can be improved by using the time conditions and the flow volume change range conditions.

Furthermore, in an another example of a technique of noise removal processing (S102 in FIG. 2) carried out by the flow volume data noise removal means 21, a technique is adopted in which the flow volume at a particular time point is determined by finding the average movement of the sampled flow volume which has a uniform length starting at the time point, with respect to the instantaneous flow volume data at that point in time. This technique is expressed by the following expression (3), taking the uniform length to be 4, for example.

Average movement $M0=(Q0+Q1+Q2+Q3)/4$

Average movement $M1=(Q1+Q2+Q3+Q4)/4$ Expression (3)

According to this technique, by removing noise from the instantaneous flow volume data similarly to the technique according to conditional expression (1) or (2) described above, it is possible to process the data into data that can be readily handled in the subsequent object extraction processing and gas flow characteristics extraction processing. In particular, this technique has a merit in that it is based on an extremely straightforward calculation which simply involves finding the average movement, and therefore it is possible to improve the efficiency of the removal of noise from the instantaneous flow volume data.

(Object Extraction Processing)

As stated above, in the object extraction processing carried out by the flow volume data object extraction means 22 (S103 in FIG. 2), data for the variable portion and the flat portion of the flow volume is extracted from the instantaneous flow volume data q[t] after noise removal by means of the preceding noise removal processing. One possible example of a technique for the object extraction processing (S103 in FIG. 2) carried out by the flow volume data object extraction means 22 is a technique expressed by the conditional expression (4) shown below.

$$\text{if} \quad \text{Expression (4)}$$
$$|q[t+3]+q[t+2]+q[t+1]-q[t\cdot3]-q[t\cdot2]-q[t\cdot1]| >$$
$$\text{threshold value or } q[t] * \text{uniform ratio}$$
$$\text{then}$$
$$\text{variable portion} = \text{data for three time points: the time}$$
$$\text{point } t \text{ and time point before and after same}$$

Furthermore, if portions which satisfy this conditional expression (4) continue, then these are collected together to define the variable portion. The whole variable portion is determined by this conditional expression (4) and the remaining portion is taken to be the flat portion.

Figure 4:
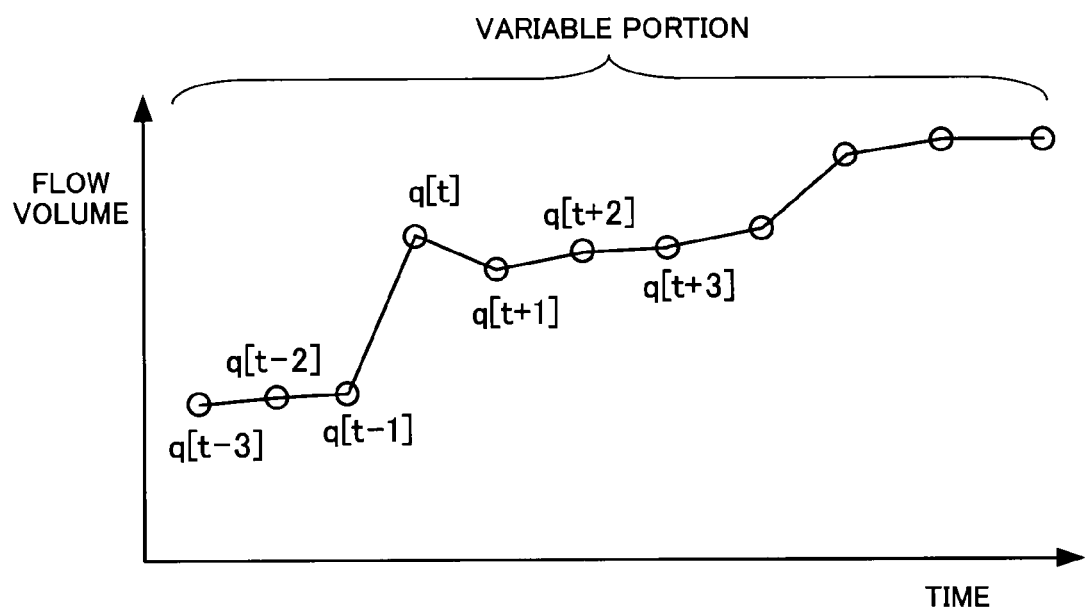
FIG. 4 is a diagram showing one example of a technique of object extraction processing according to the first embodiment.

FIG. 4 is a diagram showing a technique based on the conditional expression (4) of this kind, and it shows one example of a variable portion which is determined in a case where portions which satisfy the conditional expression (4) continue subsequently after the data of the three time points, namely, the particular time point t and the time points before and after same, of the instantaneous flow volume data plotted on a graph of flow volume against time.

According to this technique, if portions which satisfy the conditional expression (4) continue to be present, then by gathering this data together to define the variable portion, it is possible to extract the variable portion and the flat portion accurately and efficiently, without dividing into excessively small divisions, and hence the data can be processed into data that can be handled readily in the subsequent characteristics extraction processing.

(Gas Flow Characteristics Extraction Processing)

Figure 5:
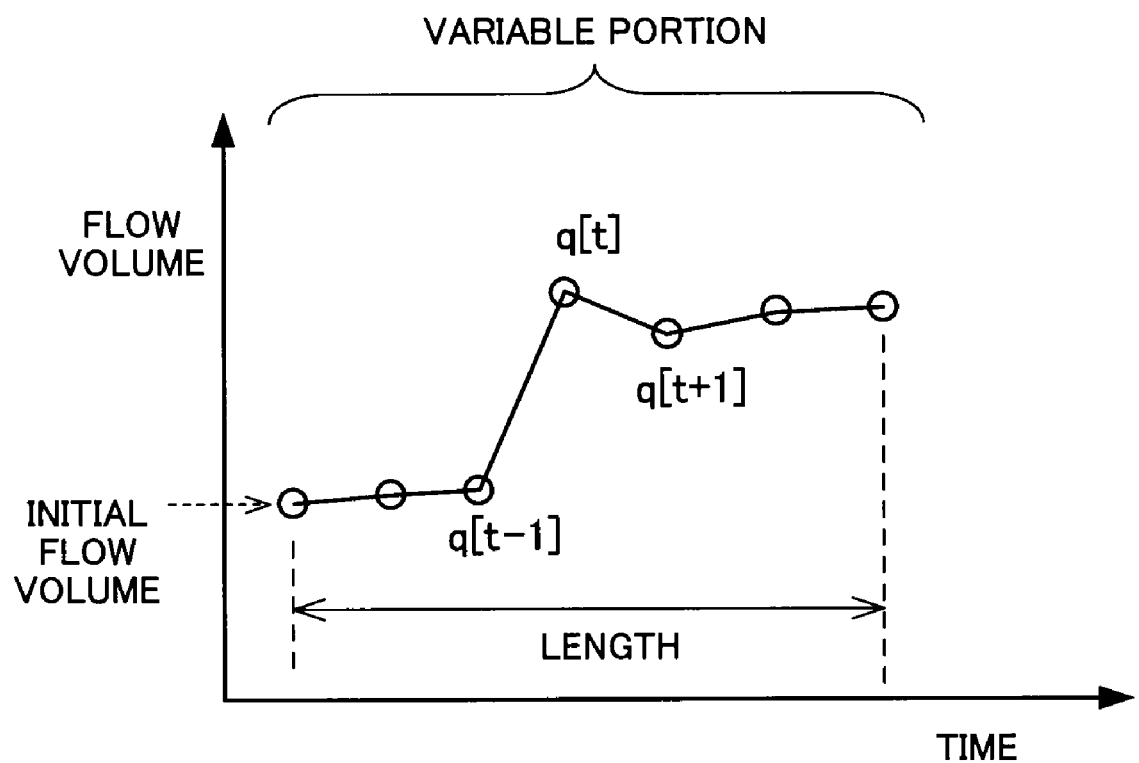
FIG. 5 is a diagram showing one example of a technique of extracting the "length" and "initial flow volume" of the variable portion of the flow volume, in the gas flow characteristics extraction processing according to the first embodiment.

As stated previously, in the gas flow characteristics extraction processing carried out by the gas flow characteristics extraction means 31 (S104 in FIG. 2), firstly, the "length", "initial flow volume" and "sequence of transited regions" are extracted as the characteristics of the variable portion of the flow volume, and the "length", "average value" and "gradient" are extracted as the characteristics of the flat portion of the flow volume, from the variable portion and the flat portion of the flow volume extracted by the object extraction processing of the preceding stage. FIG. 5 shows an example in which the "length" and "initial flow volume" of the variable portion of the flow volume are extracted.

Figure 6:
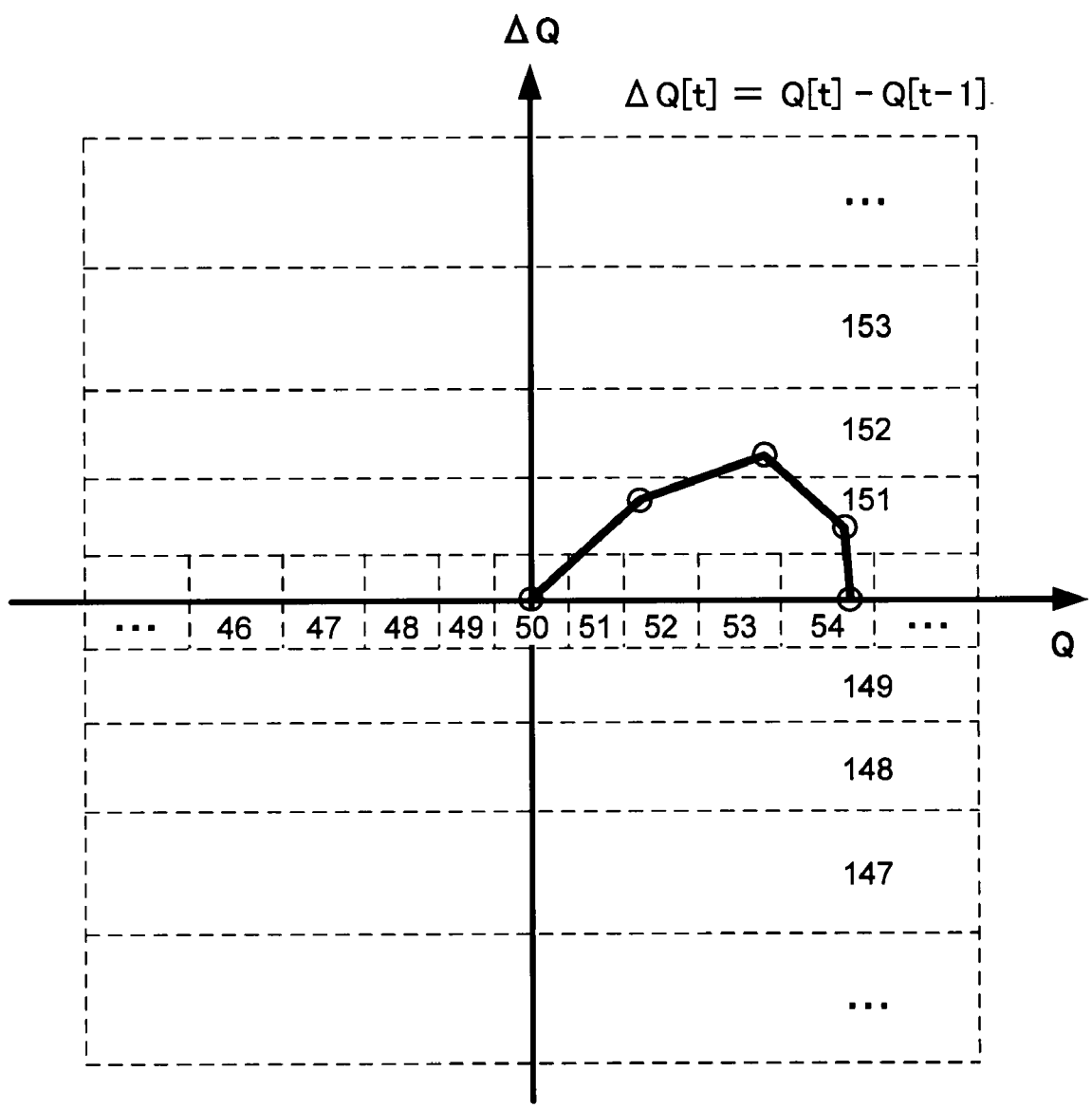
FIG. 6 is a diagram showing one example of a technique of extracting the "sequence of transited regions" of the variable portion of the flow volume, in the gas flow characteristics extraction processing according to the first embodiment.

Furthermore, FIG. 6 shows one example of a technique for extracting the "sequence of transited regions" of the variable portion of the flow volume. Here, the instantaneous flow volume Q and the instantaneous flow volume time differential value $\Delta Q$ ($\Delta Q[t]=Q[t]-Q[t-1]$) are plotted on a graph of a Q–$\Delta Q$ plane and are divided into respective regions, each of the divided regions being assigned with a unique region number which identifies that region. The region numbers which indicate the "sequence of transited regions" are extracted by determining the transitions of these values of Q and $\Delta Q$.

As shown in FIG. 6, in dividing up the regions, it is possible to ascertain the initial flow volume or the flow volume during steady combustion in a detailed fashion, by dividing the region where the instantaneous flow volume time differential value $\Delta Q$ is close to zero, into particularly fine regions on the basis of the value of the instantaneous flow volume Q. In other words, the initial flow volume of the variable portion and the average flow volume of the flat portion have characteristics which correspond to a type of gas appliance, and therefore by dividing into fine sections on the basis of the value of Q only in the portion where $\Delta Q$ is close to zero, it is possible to extract those characteristics accurately.

Furthermore, in a proportionately controlled appliance, such as a fan heater, the amount of combustion is controlled in steps from maximum combustion until steady combustion, and therefore in the case of a proportionately controlled appliance of this kind also, as shown in FIG. 6, it is possible to extract accurately the characteristics of the transitions of the amount of combustion, by dividing into small sections on the basis of the value of Q only in the portion where $\Delta Q$ is close to zero.

In the example in FIG. 6, consecutive region numbers in double figures, "46" to "54", are assigned to the plurality of regions in the portion where the instantaneous flow volume time differential value $\Delta Q$ is close to zero, and consecutive region numbers in three figures, "149" to "147" and "151" to "153" are assigned to the regions on either side of these regions, where the instantaneous flow volume time differential value $\Delta Q$ is a negative value or a positive value. In the example shown in FIG. 6, if the region number sequence is extracted as the "sequence of transited regions" which relates to the "transition of the Q and $\Delta Q$ values of the variable portion of the flow volume" which is indicated by the bold line, then this sequence is "50, 151, 152, 151, 54".

Furthermore, as another technique which uses this same graph of Q–$\Delta Q$ plane, it is possible to determine the transitions of the instantaneous flow volume and the time differential value of the instantaneous flow volume in the range until the instantaneous flow volume time differential value $\Delta Q$ converges to not more than a uniform value, or until the sign of the instantaneous flow volume time differential value $\Delta Q$ changes between positive and negative, and in this way to extract the number of sampled transit points and the region numbers of the start and end points which indicate the "sequence of transited regions".

In the example shown in FIG. 6, if the number of sampled transit points and the region numbers of the start point and the end point are extracted until the time differential value $\Delta Q$ converges to not more than a uniform value (inside the region including zero), as the "sequence of transited regions" which relates to the "transitions of the combination of Q and $\Delta Q$ values of the variable portion of the flow volume" indicated by the bold line, then the region numbers of the start and end points of the region including zero will be "50" and "54", and the number of sampled transit points will be "3". Therefore, if a "number sequence which is composed of the region number of the start point, the number of samples, and the region number of the end point" is extracted as the "sequence of transited regions" in this case, then the sequence "50, 3, 54" is obtained.

In the gas flow characteristics extraction processing (S104 in FIG. 2) carried out by the gas flow characteristics extraction means 31, next, the "length" and "initial flow volume" of the variable portion of the flow volume, and the "length", "average value" and "gradient" of the flat portion of the flow volume are respectively converted into division numbers of the division table stored in the division table storage means 32. Here, the division table is a table in which the assumed range of the respective indicator values described above which indicate numerical magnitudes in relation to the variable portion and the flat portion of the flow volume is divided up into a plurality of divisions, each division being assigned with a division number which indicates that division.

FIG. 7 shows one example of a flow volume division table which is one example of a division table of this kind. The flow volume is divided up every 10 L/h, and a flow volume division number which indicates the flow volume division is associated with each division. Furthermore, a length division table which associates length division numbers that indicate respective length divisions and a gradient division table which associates gradient division numbers that indicate respective gradient divisions are used similarly in respect of the length or gradient. By using these division tables in the gas flow characteristics extraction processing, the "length" and "initial flow volume" of the variable portion of the flow volume are converted respectively to a "length division number" and "initial flow volume division number", and the "length", "average value" and "gradient" of the flat portion of the flow volume are converted respectively to a "length division number", "average value division number" and "gradient division number".

The data finally obtained as the gas flow characteristics as a result of the gas flow characteristics extraction processing (S014 in FIG. 2) performed by the gas flow characteristics extraction means 31 described above is composed of: a "length division number", an "initial flow volume division number" and a "(number sequence indicating the) sequence of transited regions" for the variable portion of the flow volume, and a "length division number", and "average value division number" and a "gradient division number" for the flat portion of the flow volume.

According to the gas flow characteristics extraction processing described above, by extracting the "length", "initial flow volume" and "sequence of transited regions" of the variable portion of the flow volume, and by extracting the "length", "average value" and "gradient" of the flat portion of the flow volume, it is possible to extract accurately and efficiently the characteristics of the variable portion and the flat portion of the flow volume. By ultimately extracting these characteristics as "characteristics indicated by a combination of numbers", such as division numbers and region numbers, it is possible to simplify the data indicating the characteristics into number sequence data, and therefore it is possible to reduce the overall volume of data which indicates the characteristics to a small data volume.

In particular, if a technique is employed which extracts a "number sequence composed of the region number of the start point, the number of samples, and the region number of the end point", as the "sequence of transited regions", then the number sequence data can be further simplified in comparison with a technique which extracts a region number sequence, and therefore the overall volume of data which represents the characteristics can be reduced yet further.

(Rule Match Search and Point Addition Processing and Appliance in Use Determination Processing)

As described above, in the case of judgment mode (YES at S105 in FIG. 2), the characteristics of the variable portion and the flat portion of the flow volume extracted by the gas flow characteristics extraction processing (S104 in FIG. 2) are transferred to the rule match search and point addition means 43, and a rule match search and point addition processing (S106 in FIG. 2) is carried out by the rule match search and point addition means 43.

In the rule match search and point addition processing carried out by the rule match search and point addition means 43, a rule having characteristics data which matches the characteristics of the variable portion and the flat portion of the received flow volume information is found among the rules stored in the rule storage means 42, and points which indicate the probability of the gas appliance type or the existence of a gas leak which is indicated by that rule are added up respectively for the gas appliance type or gas leak. The additional point obtained in this case is determined on the basis of previously established conditions in accordance with the degree of matching with the rule, and in the present embodiment, as stated previously, different points are added in a case where the rule matches completely and in a case where it matches partially.

Furthermore, the rules stored in the rule storage means 42 are rules which include the characteristics data of the variable portion and rules which includes the characteristics data of the flat portion, for respective gas appliance types or for a gas leak, and in the present embodiment, variable portion and flat portion rules which include characteristics data indicated by a combination of numbers such as those shown in FIGS. 8A and 8B, for example, are prepared in advance in respect of the "characteristics indicated by a combination of numbers" which have been obtained by the gas flow characteristics extraction processing of the preceding stage.

In the example of rules shown in FIG. 8, the respective additional points in the case of a complete matching and a partial matching are also included as a part of the rules, but as a modification example, it is also possible to prepare the additional points in an additional points table which is separate from the rules.

As a result of the rule match search and point addition processing (S106 in FIG. 2) carried out by the rule match search and point addition means 43 as described above, a final cumulative points score is totalized for each gas appliance type or for the existence of a gas leak. FIG. 9 shows one example of totalized cumulative points scores of this kind.

As shown in FIG. 9, the cumulative points score obtained as a result from the rule match search and point addition processing is compared with a previously established threshold value, in an appliance in use determination processing (S107 in FIG. 2) which is carried out by the appliance in use determination means 44, and a gas appliance having a cumulative points score which is not less than the threshold value is determined to be in use, in which case the appliance type information, such as appliance number or appliance name, etc., which identifies that type of gas appliance, is output as a judgment result. For example, if the threshold value is "90", then in the example in Table 4, since the cumulative points score for the appliance number "Appliance 4" is "90", then it is determined that "Appliance 4", is in use and the appliance number "Appliance 4" is output as the judgment result.

Furthermore, if the cumulative points score for a gas leak is not less than the threshold value, then it is determined that there is a gas leak, and gas leak warning information, such as a message indicating the existence of a gas leak, is output as a judgment result.

According to the rule match search and point addition processing and appliance in use determination processing described above, an extremely simple compare and search operation is carried out in order to identify whether or not the characteristics which are represented by a combination of numbers include the same numbers as rules which are based on similar numbers. And then, a straightforward point addition operation is simply performed in accordance with the results of the comparison and search operation. Therefore, it is possible to judge an appliance efficiently, with a high degree of accuracy.

Furthermore, it is also considered that processing for resetting to zero or reducing the points score for the respective appliances is carried out in any one of the following instances, either in the rule match search and point addition processing or the appliance in use determination processing.

"If it is determined that a certain appliance is in use, then the points score for that appliance is reset to zero."

"The points for all appliances are reset to zero, at uniform intervals."

"The points added for a specified rule are reduced after a prescribed time period."

"If the flow volume has become zero, then the points for all appliances are reset to zero."

By reducing the points scores for each appliance or resetting same to zero at these timings, it is possible to carry out flexible and highly accurate appliance judgment in accordance with the actual circumstances of use of the appliance.

(Judgment Result Output Processing)

As stated previously, in the judgement result output processing (S108 in FIG. 2) performed by the judgment result output means 50, the judgment result, which is gas appliance type information or gas leak warning information, etc., obtained by the appliance in use determination processing (S107 in FIG. 2) performed by the appliance in use determination means 44 is output to the operator side in a form which presents and reports the judgment result, such as a display screen. According to this judgment result output processing, a relevant person is able to ascertain quickly and readily the type of gas appliance in use, or a gas leak warning message, etc., and therefore can swiftly carry out countermeasures, such as shutting off the gas supply, in the event of a gas leak.

(Rule Generation Processing)

As stated previously, in the case of rule generation mode (NO at S105 in FIG. 2), the characteristics of the variable portion and the flat portion of the flow volume which have been extracted in the gas characteristics extraction processing (S104 in FIG. 2) are transferred to the rule generation means 45, which carries out rule generation processing (S109 in FIG. 2).

In the rule generation process carried out by the rule generation means 43, new rules which respectively include the characteristics data the variable portion and the flat portion of the flow volume for a gas appliance type or for the existence of a gas leak are generated on the basis of the characteristics of the variable portion and the flat portion of the flow volume obtained in the gas flow characteristics extraction processing, and separately acquired information indicating gas appliance types or the existence of a gas leak, and these new rules are stored in the rule storage means 42. This rule generation processing is carried out by supplying gas appliance type information or gas leak information to the rule generation means and setting same to rule generation mode. This is done, for instance, before installing the gas appliance judgment apparatus according to the present embodiment, when the type of gas appliance to which gas is to be supplied has been identified, or when it is wished to create characteristics data for a gas leak.

In this rule generation processing, rules of a variable portion and a flat portion including characteristics data which is represented by a combination of numbers such as those shown in FIGS. 8A and 8B are generated by using conditions of the following kind, for instance.

"The points of a complete matching are not less than the points of a partial matching."

"If a plurality of rules have been generated, then any rules which have a matching appliance number and completely matching characteristics are duplicate rules and are therefore collected into one rule."

"Rules which have different appliance numbers but completely or partially matching characteristics will have similar characteristics in the case of different appliances, and are therefore set to a low points score."

"Rules which have a long variable portion are considered to include a large number of characteristics, and are therefore set to a high points score."

By providing a rule generation function of this kind in the gas appliance judgment apparatus, then even in cases where a new gas appliance for which there are no existing rules is introduced, it is possible to generate a rule for that gas appliance readily and accurately, and therefore excellent practicality is obtained.

Advantageous Effects

According to the first embodiment which was described above, the following advantageous effects are obtained.

Firstly, by judging the type of gas appliance or the existence of a gas leak on the basis of a combination of the instantaneous gas flow volume and the time differential value of the instantaneous gas flow volume, it is possible to identify an appliance even if that appliance cannot be identified on the basis of the flow volume pattern and flow volume range alone. As a result, there are no longer any problems in which the type of gas appliance cannot be identified and a gas leak is judged unduly, and therefore safety performance is improved.

In particular, by using the time differential value of the instantaneous flow volume in order to identify an appliance, it is possible to simplify the patterns used for comparison, with respect to a case where the appliance is identified simply by matching the flow volume pattern, and various techniques for extracting the characteristics can be applied freely. As a result, it is possible to judge an appliance efficiently with a high degree of accuracy, simply by extracting the characteristics including a combination of the instantaneous flow volume and the time differential value of the instantaneous flow volume and comparing same with a simple pattern for comparison.

Furthermore, since the start-up time and the end time of the gas appliance can be identified from the combination of the instantaneous flow volume and the time differential value of the instantaneous flow volume, then it is possible to judge between the occurrence of a gas leak and the continuous use of a gas appliance which is not fitted with a governor, efficiently and accurately. In conjunction with this, it is also possible to measure the continuous use time of the gas appliance and therefore further operations, such as issuing a suitable warning in response to prolonged use of the gas appliance, also become possible.

Consequently, according to the first embodiment, it is possible to provide a gas appliance judgment apparatus and method whereby the type of gas appliance in use can be identified or the existence of a gas leak can be determined, efficiently and accurately, as well as being able to distinguish efficiently and accurately between the existence of a gas leak and the continuous use of a gas appliance which is not fitted with a governor.

Moreover, by employing a characteristics extraction technique in which the measured instantaneous flow volume and time differential value of the instantaneous flow volume are represented on a plane and divided in respective regions, then it is possible to judge the appliance efficiently and accurately, simply by means of a relatively straightforward comparison/search and calculation operation which involves checking whether or not the extracted characteristics contains the same regions as a comparison pattern, in contrast to a pattern matching technique which plots a graph of the actual flow volume pattern.

In particular, by using one number to indicate each region, and by dividing the respective index values showing the magnitude of a numerical quantity into a plurality of ranges and indicating these values by means of a number which indicates the respective division, an extremely simple compare and search operation is carried out which involves checking whether or not the "characteristics indicated by a combination of numbers" include the same numbers as the rules which are based on similar numbers, and then the points added simply in accordance with the results of the compare and search results. As a result of these operations, highly efficient and accurate appliance judgment can be achieved.

Second Embodiment

Composition

Figure 10:
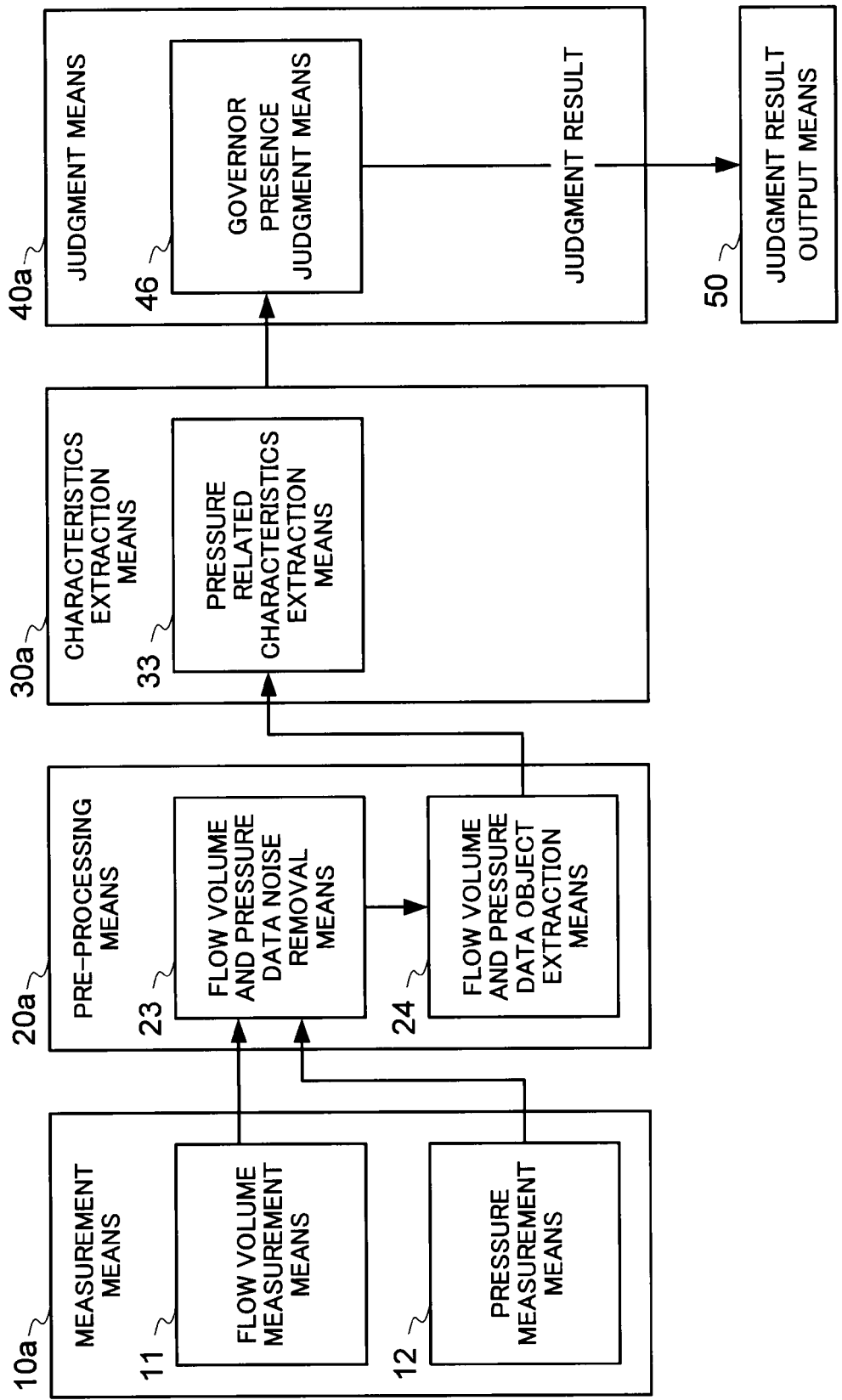
FIG. 10 is a functional block diagram showing the composition of a gas appliance judgment apparatus according to a second embodiment to which the present invention is applied.

FIG. 10 is a functional block diagram showing the composition of the gas appliance judgement apparatus according to a second embodiment to which the present invention is applied. As shown in FIG. 10, in the gas appliance judgment apparatus according to the present embodiment, the composition of the measurement means 10, the pre-processing means 20, the characteristics extraction means 30 and the judgment means 40 according to the first embodiment is changed and a measurement means 10a, a pre-processing means 20a, a characteristics extraction means 30a and a judgment means 40a are provided instead. The details of the means 10a to 40a are described below.

The measurement means 10a has, in addition to a flow volume measurement means 11 similar to that of the first embodiment, a pressure measurement means 12 which measures the pressure p[t] of the gas flowing inside the gas supply flow channel (gas pipe). It is possible to use various types of pressure meter and pressure sensor for this pressure measurement means 12.

The pre-processing means 20a has a flow volume and pressure data noise removal means 23 which removes noise from the instantaneous flow volume data and the pressure data measured by the flow volume measurement means 11 and the pressure measurement means 12, and a flow volume and pressure data object extraction means 24 which respectively extracts data for a uniform time period at respective sampling timings, from the instantaneous flow volume data and the pressure data after noise removal.

The characteristics extraction means 30a has a pressure related characteristics extraction means 33 which extracts, as characteristics of the data for the prescribed time period extracted by the flow volume and pressure data object extraction means 24, characteristics including the dispersion in the ratio between the flow volume and the square root of the pressure or the ratio between the flow volume and the pressure. This pressure related characteristics extraction means 33 extracts the "normalized flow volume dispersion" and the "average flow volume" by determining the standard deviation and average value of the flow volume from the data for the prescribed time period extracted by the flow volume and pressure data object extraction means 24, and it also extracts the "normalized nozzle dispersion" of the gas spray nozzle opening amount by determining the standard deviation and average of the ratio between the flow volume and the square root of the pressure or the ratio between the flow volume and the pressure.

The judgment means 40a has a governor presence judgment means 46 which judges the presence or absence of a governor in use, on the basis of the data for a prescribed time period which has been extracted by the pressure related characteristics extraction means 33. This governor presence judgment means 46 judges the presence or absence of a governor in use on the basis of the "normalized flow volume dispersion", "normalized nozzle dispersion" and "average flow volume" which have been extracted by the pressure related characteristics extraction means 33, and furthermore even in cases where it is not possible to judge the presence or absence of a governor, ultimately one of the following judgment results, "governor present", "governor absent", "judgment impossible" and "no pressure change", is determined and output by judging the presence or absence of pressure variations.

(Summary of Gas Appliance Judgment Procedure)

Figure 11:
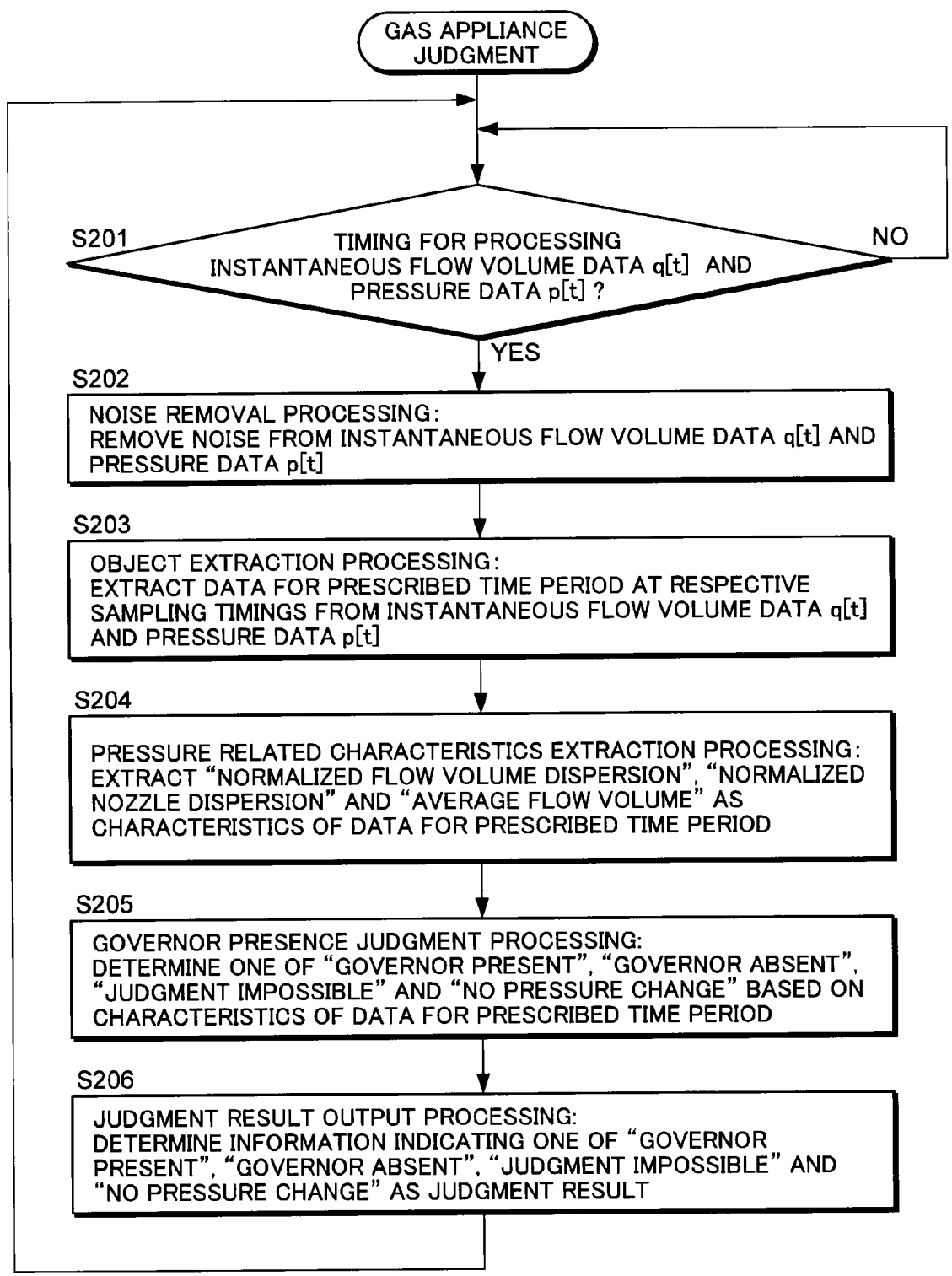
FIG. 11 is a flowchart showing one example of a gas appliance judgment procedure performed by a gas appliance judgment apparatus according to the second embodiment.

FIG. 11 is a flowchart showing one example of a gas appliance judgment procedure performed by a gas appliance judgment apparatus according to a second embodiment. In the gas appliance judgment apparatus according to the present embodiment, the flow volume measurement means 11 and the pressure measurement means 12 respectively measure the instantaneous flow volume and pressure of the gas flowing inside the gas supply flow channel (gas pipe) constantly at a uniform sampling cycle (for example, every two seconds in both cases), and the instantaneous flow volume data q[t] and pressure data p[t] thus measured are supplied to the flow volume and pressure data noise removal means 23.

In the flow volume and pressure data noise removal means 23, the noise of the instantaneous flow volume data q[t] and the pressure data p[t], which has been gathered at respective previously established processing timings (YES at S201) for the instantaneous flow volume and pressure data q[t] and p[t], is removed (S202: noise removal processing). In the flow volume and pressure data object extraction means 24, data for a prescribed time period at the respective sampling timings is extracted from the instantaneous flow volume data q[t] and pressure data p[t] after noise removal (S203: object extraction processing).

In the pressure related characteristics extraction means 33, the "normalized flow volume dispersion", "normalized nozzle dispersion" and "average flow volume" are extracted as characteristics of the data for the prescribed time period extracted by the flow volume and pressure data object extraction means 24 (S204: pressure related characteristics extraction processing).

The governor presence judgment means 46 determines and outputs one of the following judgment results, "governor present", "governor absent", "judgment impossible" and "no pressure change", on the basis of the characteristics of the data for the prescribed time period extracted by the pressure related characteristics extraction means 33, in other words, the "normalized flow volume dispersion", "normalized nozzle dispersion" and "average flow volume" (S205: governor presence judgment processing).

When a judgment result in relation to the presence or absence of a governor presence judgment means 46 has been obtained and output in this way, the judgment result is output by the judgment result output means 50, which is located in a subsequent stage, in the form of a screen display, or the like, whereby the judgment result can be indicated to or reported to a human operator (S206: judgement result output processing).

(Details of Gas Appliance Judgment Procedure)

Below, the details of the respective processings from the noise removal processing (S202) until the judgment result output processing (S206) in the gas appliance judgment procedure shown in FIG. 11 will be described successively.

(Noise Removal Processing)

In the noise removal processing (S202 in FIG. 11) performed by the flow volume and pressure data noise removal means 23, if data corresponds to any one of the following three conditions:

"flow volume is not more than a prescribed value"
"flow volume variation is not less than a prescribed value (or prescribed ratio)" and
"variation in square root of pressure or pressure value is not less than a prescribed value (or prescribed ratio)", then the data is removed from the instantaneous flow volume data q[t] and pressure data p[t] which has been measured.

The technique used in this noise removal processing is expressed, for example, by the following expression (5), if q[t] is taken to be the original flow volume data and p[t] is taken to be the original pressure data.

$$\begin{aligned}&\text{if} \\ &\min(q[t-1], q[t], q[t+1]) < \text{prescribed value} \\ &\text{or} \\ &\max(q[t-1], q[t], q[t+1]) - \\ &\quad \min(q[t-1], q[t], q[t+1])) < \\ &\quad\quad \text{prescribed value or } q[t] * \text{prescribed ratio} \\ &\text{or} \\ &\max(\sqrt{p[t-1]}, \sqrt{p[t]}, \sqrt{p[t+1]}) - \\ &\quad \min(\sqrt{p[t-1]}, \sqrt{p[t]}, \sqrt{p[t+1]})) < \\ &\quad\quad \text{prescribed value or } q[t] * \text{prescribed ratio}, \\ &\text{then} \\ &q[t], p[t] \text{ are removed} \begin{pmatrix} \text{and not used in the} \\ \text{subsequent processing} \end{pmatrix}\end{aligned}$$

Expression (5)

According to this noise removal processing, it is possible to convert the data into data which can be readily handled in the subsequent object extraction processing or pressure related characteristics extraction processing, by removing noise from the instantaneous flow volume data and pressure data. In particular, a merit is obtained in that the accuracy of the removal of noise from the instantaneous flow volume data and pressure data can be improved by using respective range conditions for the flow volume, the variation in flow volume, and the variation in the square root of the pressure.

In order to reduce the calculational load, it is also possible to substitute the square root of the pressure $\sqrt{p}$ in the conditional expression (5) described above, with the pressure p. In other words, if the change in the gas pressure is relatively small, then even if the pressure is used as a substitute value for the square root of the pressure, the resulting error in calculation can be considered to be small and therefore it is possible to improve the efficiency of the noise removal processing by reducing the calculational load through substituting the pressure value.

(Object Extraction Processing)

As stated previously, in the object extraction processing (S203 in FIG. 11) performed by the flow volume and pressure data object extraction means 24 (S203 in FIG. 11), data for a prescribed time period is extracted respectively at respective sampling timings from the instantaneous flow volume data q[t] and pressure data p[t] after noise removal by the noise removal processing of the preceding stage.

Here, the prescribed time period can be set appropriately, but one example of this time period is 120 seconds. In this case, for instance, if the sampling cycle of the instantaneous flow volume data q[t] and the pressure data p[t] is two seconds in both cases, then sixty sets of sampling data are extracted during the 120 seconds. The sampling cycles of the instantaneous flow volume data q[t] and pressure data p[t] do not necessarily have to be the same, and even in the case of different sampling cycles, it is possible to extract respective data for the prescribed time period by harmonizing the timing for q and p in relation to $q/\sqrt{p}$.

Figure 12:
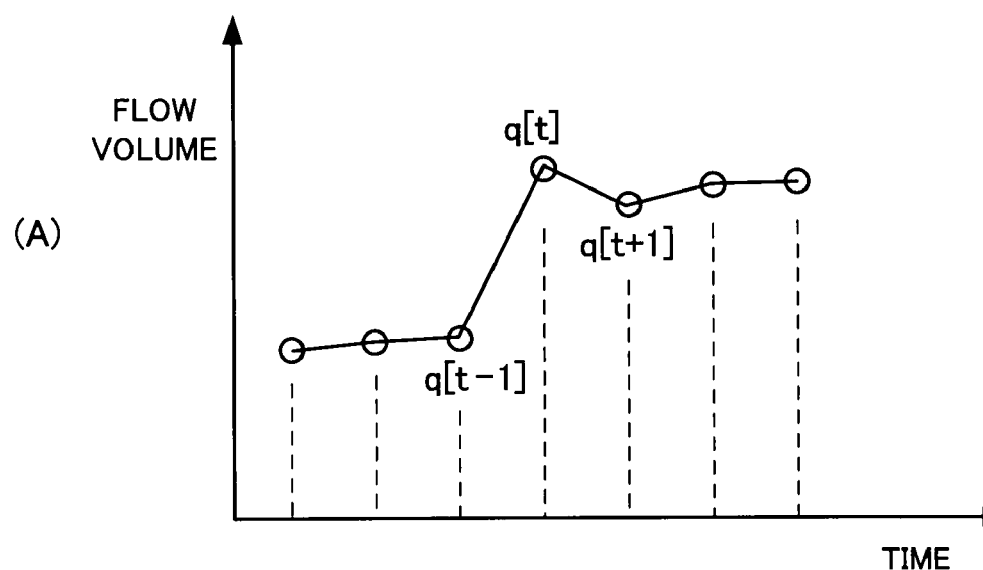
FIG. 12 is a diagram showing one example of a technique of object extraction processing according to the second embodiment.
Figure 12:
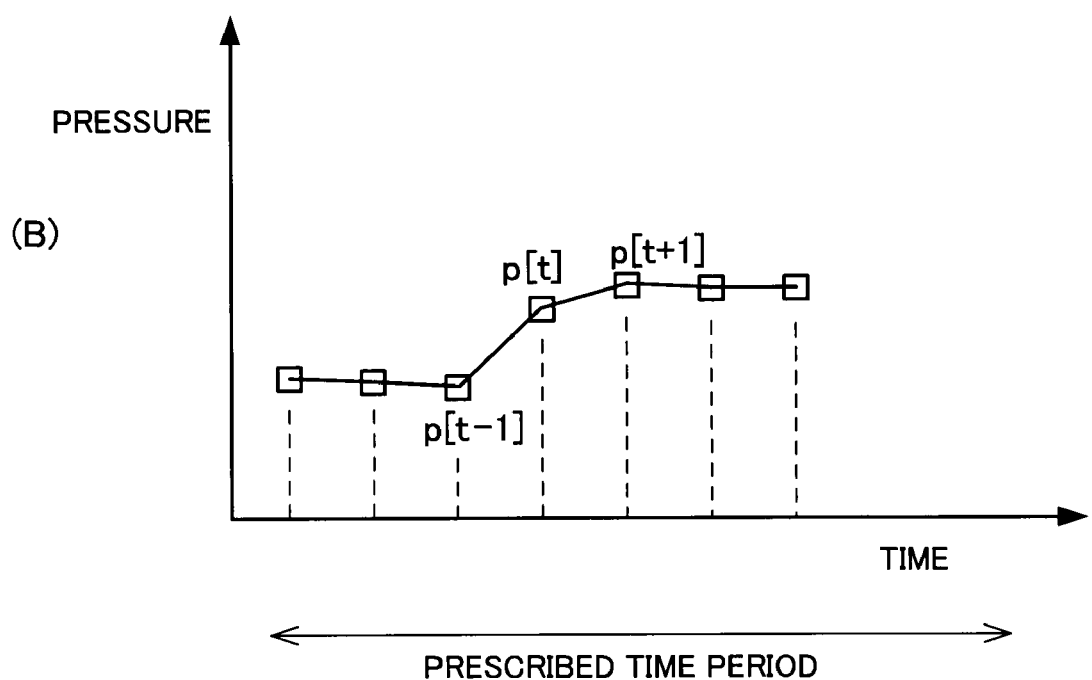

FIG. 12 is a diagram which illustrates a technique of the object extraction processing of this kind and it shows one example of mutually corresponding instantaneous flow volume data and pressure data, which is extracted as data for the same prescribed time period.

(Pressure Related Characteristics Extraction Processing)

As stated previously, in the pressure related characteristics extraction processing performed by the pressure related characteristics extraction means 33 (S204 in FIG. 11), the "normalized flow volume dispersion", "normalized nozzle dispersion" and "average flow volume" are extracted as characteristics of the data for the prescribed time period which has been extracted by the object extraction processing in the preceding stage. In practical terms, these characteristics are extracted, for example, by the following technique.

"Normalized Flow Volume Dispersion σq[t]"

By determining the standard deviation and the average value of the flow volume data q[t−n] to q[t] for the prescribed time period extracted, then $\sigma q[t]$=standard deviation/average*100.

If the number of flow volume data for the prescribed time period is smaller than a prescribed number, as a result of removing data by noise removal processing, then σq[t]=zero.

"Normalized Nozzle Dispersion σNz[t]"

Using the extracted flow volume data q[t−n] to q[t] and pressure data p[t−n] to p[t] for the prescribed time period, the equation $Nz[t]=q[t]/\sqrt{p[t]}$ is calculated, the standard deviation and average value are determined for the found nozzle opening amount data Nz[t−n] to Nz[t] for the prescribed time period, and the equation $\sigma Nz[t]$=standard deviation/average value*100 is calculated. If the number of nozzle opening amount data for the prescribed time period is smaller than a prescribed number, as a result of data being removed by the noise removal processing, then the normalized nozzle dispersion σNz[t] will be zero. In order to reduce the calculational load, it is also possible to substitute the square root of the pressure $\sqrt{p}$ with the pressure value p. Reasons for this, are the same as those in relation to the noise removal processing, as stated above.

"Average Flow Volume ave q[t]"

The average value of the flow volume data q[t−n] to q[t] for the prescribed time period extracted is determined as set as ave q[t]. If the number of flow volume data for the prescribed time period is smaller than a prescribed number as a result of removing data in the noise removal processing, then the average flow volume ave q[t] will be zero.

According to the pressure related characteristics extraction processing described above, by determining the standard deviation and average value of the ratio between the flow volume and the square root of the pressure or the ratio between the flow volume and the pressure from the flow volume and pressure data for the prescribed time period, the amount of opening of the gas spray nozzle section of the gas appliance is determined, and the "normalized nozzle dispersion", which is the dispersion in the nozzle opening amount, is extracted. These operations result in that the characteristics corresponding to the presence or absence of a governor can be extracted accurately and efficiently.

(Governor Presence Judgment Processing)

As stated above, the governor presence judgment processing carried out by the governor presence judgment means 46 (S205 in FIG. 11) determines and outputs one of the judgment results, "governor present", "governor absent", "judgment impossible" and "no pressure change", on the basis of the "normalized flow volume dispersion", "normalized nozzle dispersion" and "average flow volume", which are characteristics of the data for the prescribed time period which has been extracted by the pressure related characteristics extraction processing of the preceding stage.

Figure 13:
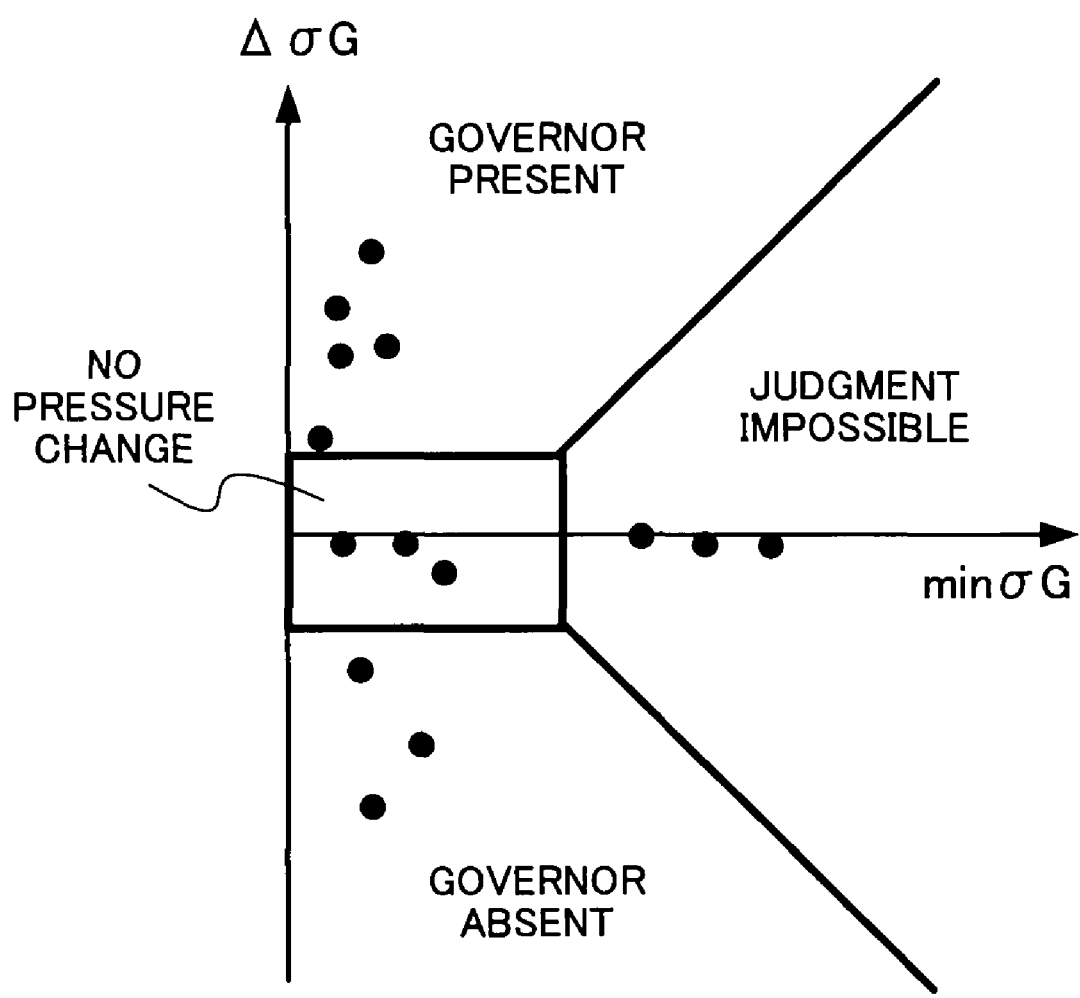
FIG. 13 is a diagram showing one example of a technique for governor presence judgment processing according to the second embodiment.

FIG. 13 shows one example of a technique of this governor presence judgment processing, wherein on the basis of the "normalized flow volume dispersion" and the "normalized nozzle dispersion", the minimum value min σG[t] of the normalized flow volume dispersion and normalized nozzle dispersion is determined by min$\sigma G[t]$=min($\sigma q[t],\sigma Nz[t]$), the difference ΔσG[t] between the normalized flow volume dispersion and normalized nozzle dispersion is determined by $\Delta\sigma G[t]=\sigma Nz[t]-\sigma q[t]$, and the value thus obtained being plotted on a plane of min σG–ΔσG, and the presence or absence of a governor is judged in accordance with the plotted region.

In this case, if the "average flow volume" is not less than the threshold value, then one of the results, "governor present", "governor absent", "judgment impossible" and "no pressure change", is determined in accordance with the region plotted in FIG. 13. The bold lines in FIG. 13 are lines which show the boundaries of the judgment regions, and judgment regions such as these are set in advance on the basis of a sufficient amount of experimental data, or the like.

In FIG. 13, the "governor present" region is a region where there is significant nozzle dispersion and little dispersion in the flow volume. In other words, the flow volume is maintained at a uniform level by adjusting the nozzle in response to pressure change. Furthermore, the "governor absent" region is a region where there is little nozzle dispersion and significant dispersion in the flow volume. In other words, the nozzle is uniform with respect to pressure change, while the flow volume changes.

Furthermore, the "judgment impossible" region is a region where there is a large dispersion in both the nozzle and the flow volume, and the "no pressure change" region is a region where both the nozzle dispersion and the flow volume dispersion are small and the amount of pressure change is close to zero. The "judgment impossible" region and the "no pressure change" region can be used to judge the existence of a gas leak, and the like.

According to the governor presence judgment processing described above, it is possible to judge the presence of a governor efficiently and accurately, simply by plotting on a two-dimensional graph, a combination of the "minimum value of the flow volume and nozzle dispersion" and the "difference between the flow volume and nozzle dispersions" which are derived in a straightforward fashion from the "normalized flow volume dispersion" and "normalized nozzle dispersion" extracted by the pressure related characteristics extraction processing in the preceding stage.

(Judgment Result Output Processing)

As stated previously, in the judgment result output processing which is performed by the judgment result output means 50 (S206 in FIG. 11), the judgment result of one of "governor present", "governor absent", "judgment impossible" and "no pressure change" which has been obtained by the governor presence judgment processing (S205 in FIG. 11) performed by the governor presence judgment means 46 is output in the form of a display screen, or the like, which can present or report the judgment result to a human operator. According to this judgment result output processing, the relevant operator can readily and immediately ascertain whether or not a gas appliance fitted with a governor is in use.

Advantageous Effects

According to the second embodiment which was described above, the following advantageous effects are obtained.

Firstly, by using the ratio between the flow volume and the square root of the pressure, or a substitute value thereof, for judging the presence or absence of a governor, it is possible to ascertain the state of the amount of nozzle opening of the gas spray nozzle of the gas appliance. In other words, if the ratio between the flow volume and the square root of the pressure is determined, then this value corresponds to the amount of opening of the gas spray nozzle section of the gas appliance, and therefore if the amount of opening of the gas spray nozzle is altered in order that the flow volume remains constant in response to pressure changes, then it is judged that a governor is present, and if the flow volume varies while the amount of opening of the gas spray nozzle remains uniform, then it is judged that a governor is not present.

If there is no governor, then this means that either the gas appliance is an appliance which is not fitted with a governor, such as a cooking stove, or there is a gas leak, and if there is a governor, then this means that the gas appliance is one which is fitted with a governor, such as a fan heater. Therefore, it is possible to distinguish accurately between a gas leak or a cooking stove which require the gas supply to be shut off especially by a safety function, and an appliance such as a fan heater in which it is necessary to prevent unwanted shut-off. As a result of this, it is possible to prevent mistaken shut-off during prolonged use of a gas appliance which is fitted with a governor, such as a fan heater.

Furthermore, since the start-up time and the end time of a gas appliance can be judged on the basis of the ratio between the flow volume and the square root of the pressure, or a substitute value, then it is also possible to distinguish efficiently and accurately between the existence of a gas leak and the continuous use of a gas appliance which is not fitted with a governor. In relation to this, since the continuous use time of the gas appliance can also be measured, then operations, such as issuing a suitable warning in respect of prolonged use of a gas appliance, also become possible.

If the change in the gas pressure is relatively small, then the pressure value itself is used as a substitute value for the square root of the pressure, and the presence of a governor can be judged with little error in calculation, simply by determining the ratio between the flow volume and the pressure. If the presence of a governor is judged by determining the ratio between the flow volume and the pressure in this way, then the calculational load can be reduced in comparison with a case where the ratio between the flow volume and the square root of the pressure is determined, and therefore the efficiency can be improved. On the other hand, if the variation in the gas pressure is relatively large, then better accuracy can be achieved by finding the ratio between the flow volume and the square root of the pressure.

Consequently, according to the second embodiment, it is possible to provide a gas appliance judgment apparatus and method whereby the presence or absence of a governor in use can be determined efficiently and accurately, as well as being able to judge efficiently and accurately between the occurrence of a gas leak and the continuous use of a gas appliance which does not have a governor.

Other Embodiments

The present invention is not limited to the embodiments described above and various other modifications are possible, within the scope of the invention. For example, a composition which combines the first and second embodiments can be considered, in which case the combined advantageous effects of both embodiments are obtained. Furthermore, the composition of the apparatus indicated in the present embodiments is merely an example, and the concrete composition of the apparatus and the composition of the respective means can be selected freely, in which case the concrete processing procedure and the details of the respective processings can also be selected freely in accordance with same.

What is claimed is:

1. A gas appliance judgment apparatus, comprising:
 a flow volume measurement means for measuring the instantaneous flow volume of gas flowing inside a gas flow channel;
 a noise removal means for removing noise from the instantaneous flow volume data which has been measured by the flow volume measurement means;
 an object extraction means for extracting data of a variable portion and a flat portion of the flow volume, from the instantaneous flow volume data from which the noise has been removed by the noise removal means;
 a characteristics extraction means for extracting, as the characteristics of the gas flow, characteristics of the data of the variable portion and the flat portion of the flow volume which has been extracted by the object extraction means;
 a rule storage means for storing respective rules which include characteristic data of the variable portion and the flat portion of the flow volume, for respective types of gas appliance or for a gas leak; and
 an appliance judgment means for determining the type of gas appliance in use or the presence or absence of a gas leak and outputs a judgment result, by comparing the characteristics data included in the rules stored in the rule storage means with the characteristics of the gas flow which has been extracted by the characteristics extraction means;
 wherein the characteristics extraction means is composed so as to extract characteristics including a combination of an instantaneous flow volume and the time differential value of the instantaneous flow volume as the characteristics of the variable portion of the flow volume.

2. A gas appliance judgment apparatus according to claim 1, wherein the noise removal means is composed such that, if the difference between a particular sampled flow volume at a particular point in time of the instantaneous flow volume data measured by the flow volume measurement means, and the sampled flow volumes before and after that particular sampled flow volume is not more than a uniform value or is not more than a uniform ratio of the flow volume at the particular point in time, then the average flow volume of the three points is set as the flow volume at the particular point in time.

3. A gas appliance judgment apparatus according to claim 1, wherein the noise removal means is composed such that the flow volume at a particular point in time is determined by finding the average movement of the sampled flow volume which has a uniform length starting at the particular point in time, with respect to the instantaneous flow volume data at the particular point in time.

4. A gas appliance judgment apparatus according to claim 1, wherein the object extraction means is composed such that, if the variation of the flow volume in a portion is not less than a uniform value or is not less than a uniform ratio of the variation, then the portion is set to a variable portion, and if the variation of the flow volume in a portion is less than the uniform value or is less than the uniform ratio of the variation, then the portion is set to a flat portion.

5. A gas appliance judgment apparatus according to claim 1, wherein the characteristics extraction means is composed such that from the data extracted by the object extraction means, the "length", "initial flow volume" and "characteristics of regions" extracted by representing the instantaneous flow volume and the time differential value of the instantaneous flow volume on a two-dimensional graph, and dividing same into regions, are extracted as the characteristics of the variable portion of the flow volume, and the "length", "average value" and "gradient" are extracted as the characteristics of the flat portion of the flow volume.

6. A gas appliance judgment apparatus according to claim 5, wherein the characteristics extraction means is composed such that, when each of the regions divided by the division is assigned with a unique region number which identifies that region, as the "characteristics of regions" of the variable portion of the flow volume extracted by the object extraction means, the region numbers which indicate the "sequence of transited regions" are extracted by determining the transitions of the instantaneous flow volume and the time differential value of the instantaneous flow volume which move in a time sequence within the divided regions.

7. A gas appliance judgment apparatus according to claim 6, wherein the characteristics extraction means is composed such that, as the "sequence of transited regions" of the variable portion of the flow volume extracted by the object extraction means, the number of sampled transit points and the region numbers of the start and end points which indicate the "sequence of transited regions" are extracted by determining the transitions of the instantaneous flow volume and the time differential value of the instantaneous flow volume in the range until the instantaneous flow volume time differential value converges to not more than a uniform value, or until the sign of the instantaneous flow volume time differential value changes between positive and negative.

8. A gas appliance judgment apparatus according to claim 5, wherein:
the characteristics extraction means has in advance a division table in which the assumed range of the respective indicator values which indicate numerical magnitudes in relation to the variable portion and the flat portion of the flow volume extracted by the object extraction means is divided up into a plurality of divisions, each division being assigned with a division number which indicates that division; and
the characteristics extraction means is composed such that using the division table, a "length division number" and "initial flow volume division number" are extracted respectively as the "length" and "initial flow volume" of the variable portion of the flow volume, and a "length division number", "average value division number" and "gradient division number" are extracted respectively as the "length", "average value" and "gradient" of the flat portion of the flow volume.

9. A gas appliance judgment apparatus according to claim 1, wherein:
the appliance judgment means has a rule match search and point addition means for searching the rules stored in the rule storage means to find a rule having characteristics data which matches the characteristics of the variable portion and the flat portion of the flow volume extracted by the gas flow characteristics extraction means, and adding points indicating the probability of the type of gas appliance, or the existence of a gas leak, indicated by that rule respectively for the type of gas appliance and for the existence of a gas leak; and
the rule match search and point addition means is composed such that different points are added between when the rule is matched completely and when the rule is matched partially.

10. A gas appliance judgment apparatus according to claim 9, wherein the appliance judgment means has a determination means for determining that a gas appliance of that type is in use, and outputting, as a judgment result, appliance type information which indicates that gas appliance type, or, determining that there is a gas leak and outputting, as a judgement result, gas leak warning information which indicates a gas leak, when the points added by the rule match search and point addition means respectively in respect of the gas appliance type or the occurrence of a gas leak are not less than a previously established threshold value.

11. A gas appliance judgment apparatus according to claim 1, further comprising a rule generation means for generating a new rule which includes the characteristics data of the variable portion and the flat portion of the flow volume relating to each gas appliance type or a gas leak, on the basis of the characteristics of the gas flow extracted by the characteristics extraction means and separately acquired information which indicates the gas appliance type or gas leak, and storing the new rule in the rule storage means.

12. A gas appliance judgment apparatus according to claim 11, wherein the gas appliance judgment apparatus actions in a selected mode from the group of:
a judgment mode in which the appliance judgment is carried out by the appliance judgment means, on the basis of the characteristics extracted by the characteristics extraction means and the existing rules stored in the rule storage means; and
a rule generation mode in which a new rule including characteristics data in accordance with a gas appliance type or a gas leak is generated by the rule generation means, on the basis of the characteristics extracted by the characteristics extraction means and separately acquired information which indicates the gas appliance type or gas leak.

13. A gas appliance judgment method, comprising the steps of:
- a flow volume measurement step for measuring the instantaneous flow volume of gas flowing inside a gas flow channel;
- a noise removal step for removing noise from the instantaneous flow volume data which has been measured by the flow volume measurement step;
- an object extraction step for extracting data of a variable portion and a flat portion of the flow volume, from the instantaneous flow volume data from which the noise has been removed by the noise removal step;
- a characteristics extraction step for extracting, as the characteristics of the gas flow, characteristics of the data of the variable portion and the flat portion of the flow volume which has been extracted by the object extraction step; and
- an appliance judgment step, using a rule storage means for storing respective rules which include characteristic data of the variable portion and the flat portion of the flow volume for respective types of gas appliance or for a gas leak, for determining the type of gas appliance in use or the presence or absence of a gas leak and outputs a judgment result, by comparing the characteristics data included in the rules stored in the rule storage means with the characteristics of the gas flow which has been extracted by the characteristics extraction step;
- wherein the characteristics extraction step includes extracting characteristics including a combination of an instantaneous flow volume and the time differential value of the instantaneous flow volume as the characteristics of the variable portion of the flow volume.

* * * * *